(12) United States Patent
Oba et al.

(10) Patent No.: US 8,706,382 B2
(45) Date of Patent: Apr. 22, 2014

(54) CONTROL DEVICE OF SPARK-IGNITION GASOLINE ENGINE

(75) Inventors: Shuji Oba, Kariya (JP); Kouhei Iwai, Hiroshima (JP); Kazuhiro Nagatsu, Hiroshima (JP); Masahisa Yamakawa, Hiroshima (JP); Noriyuki Ota, Hiroshima (JP); Naoya Watanabe, Higashihiroshima (JP); Hiroyuki Kurita, Hiroshima (JP); Tatsuya Fujikawa, Aki-gun (JP); Kenji Uchida, Higashihiroshima (JP); Daisuke Asaji, Hiroshima (JP); Takaaki Nagano, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 263 days.

(21) Appl. No.: 13/368,253

(22) Filed: Feb. 7, 2012

(65) Prior Publication Data
US 2012/0216774 A1    Aug. 30, 2012

(30) Foreign Application Priority Data

Feb. 24, 2011    (JP) ................................ 2011-038806

(51) Int. Cl.
    *F02D 41/40*    (2006.01)
(52) U.S. Cl.
    USPC ........... 701/104; 701/105; 123/305; 123/457; 123/458; 123/511

(58) Field of Classification Search
    USPC ........... 701/104, 105; 123/305, 457, 458, 511
    See application file for complete search history.

(56) References Cited

U.S. PATENT DOCUMENTS

| | | | | |
|---|---|---|---|---|
| 5,313,924 | A * | 5/1994 | Regueiro | 123/456 |
| 7,104,255 | B2 * | 9/2006 | Hashima et al. | 123/431 |
| 7,328,684 | B2 * | 2/2008 | Saito et al. | 123/299 |
| 2006/0207550 | A1 * | 9/2006 | Saito et al. | 123/305 |
| 2007/0227503 | A1 | 10/2007 | Hitomi et al. | |
| 2009/0159045 | A1 | 6/2009 | Hitomi et al. | |

FOREIGN PATENT DOCUMENTS

| | | |
|---|---|---|
| JP | 2007-154859 A | 6/2007 |
| JP | 2007-292050 A | 11/2007 |

* cited by examiner

*Primary Examiner* — Erick Solis
(74) *Attorney, Agent, or Firm* — Alleman Hall McCoy Russell & Tuttle LLP

(57) ABSTRACT

The disclosure provides a control device of a spark-ignition gasoline engine. When an operating state of an engine body is within a low engine speed range, a controller controls a fuel pressure variable mechanism so that a fuel pressure is higher within a high engine load range compared to a low engine load range, the controller operates, within the high engine load range, a fuel injection valve to perform a fuel injection at least at a timing that is more retarded than an injection timing of a fuel within the low engine load range and is within a retard period from a late stage of a compression stroke to an early stage of an expansion stroke, and the controller operates, within the high engine load range, an ignition plug to ignite at a timing within the retard period and further after the fuel injection.

13 Claims, 19 Drawing Sheets

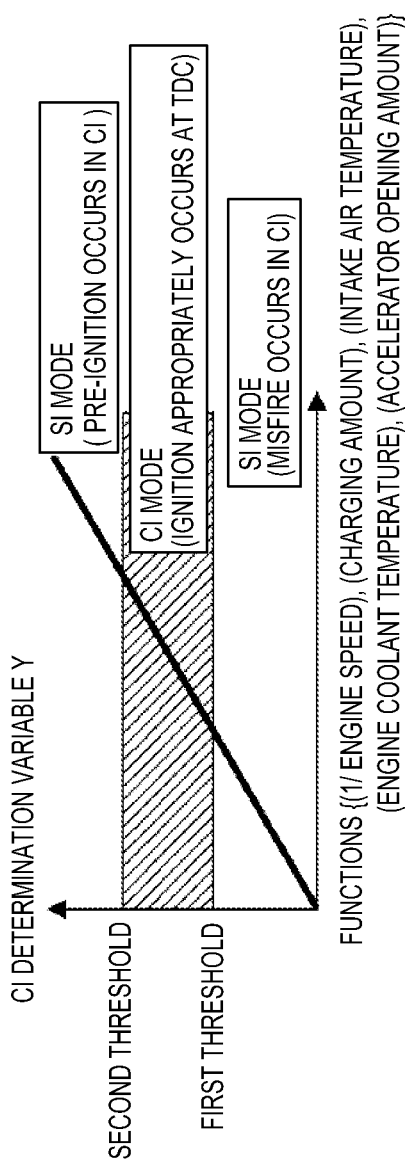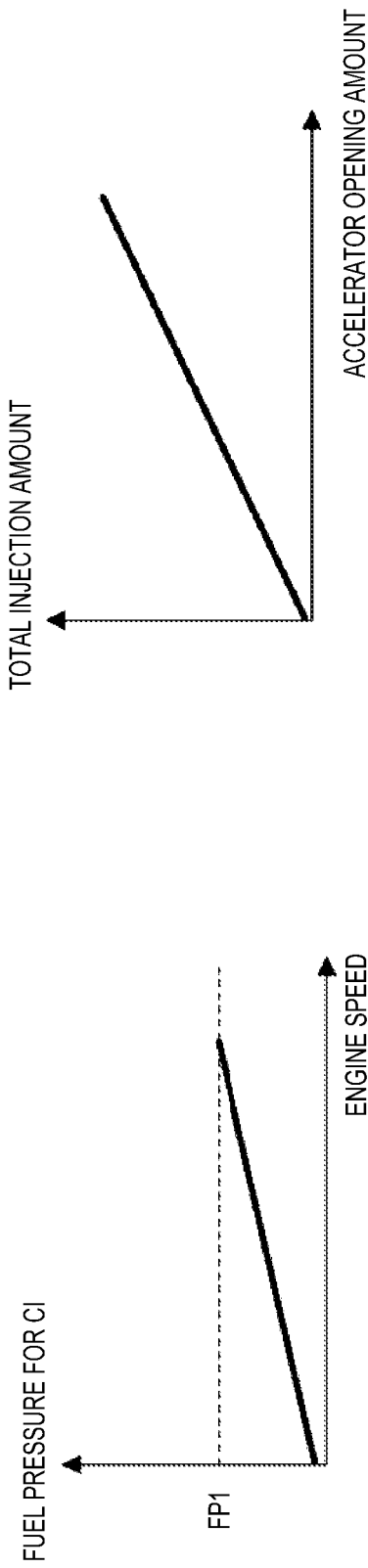

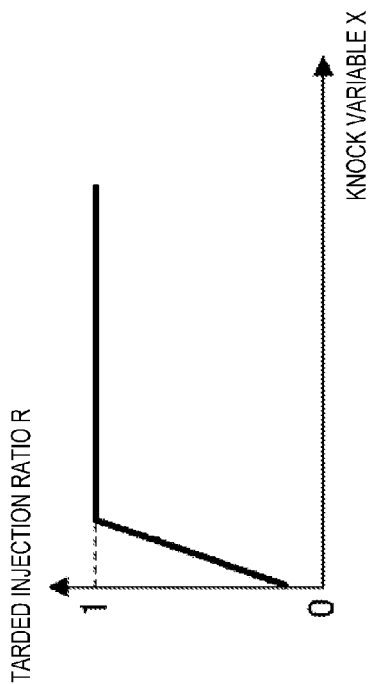
FIG. 18D
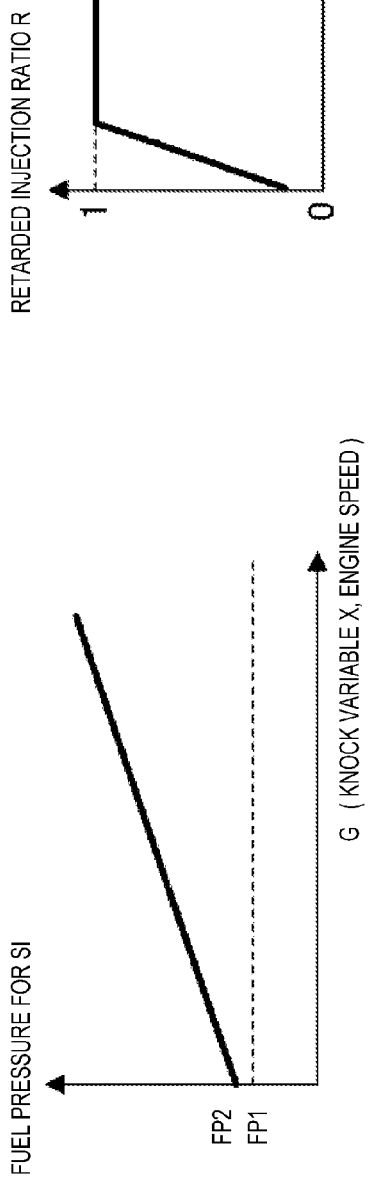
FIG. 18E
FIG. 18F
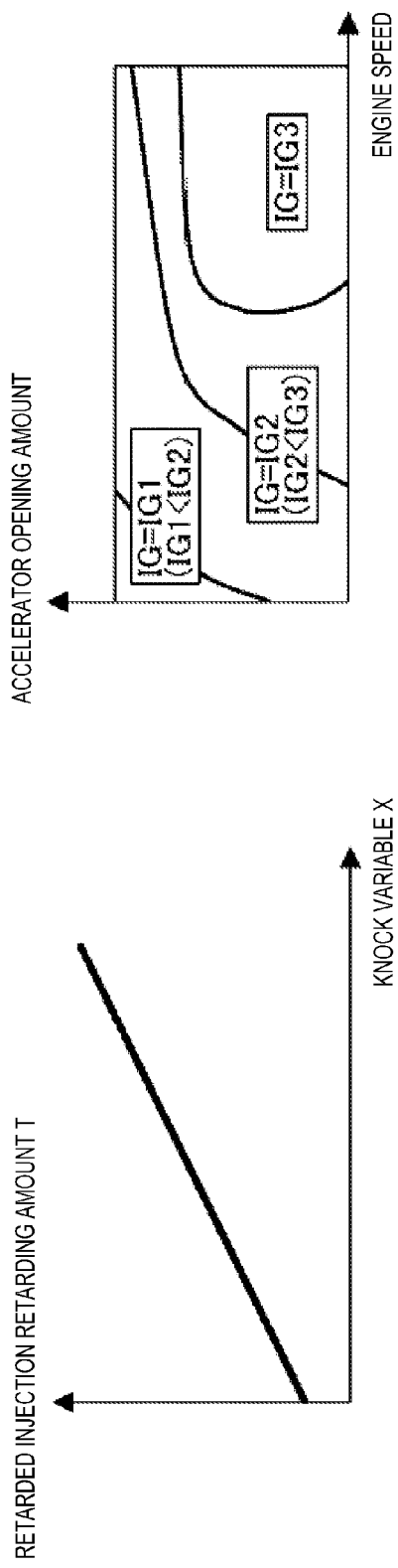
FIG. 18G

CONTROL DEVICE OF SPARK-IGNITION GASOLINE ENGINE

BACKGROUND

The present invention relates to a control device of a spark-ignition gasoline engine.

In improving a theoretical thermal efficiency of a spark-ignition gasoline engine, increasing a geometric compression ratio of the spark-ignition gasoline engine is effective. For example, JP2007-292050A discloses a high compression ratio spark-ignition direct injection engine in which a geometric compression ratio is set at 14:1 or above.

Further, as an art of achieving both an improvement in exhaust emission and an improvement in thermal efficiency, for example, as disclosed in JP2007-154859A, a combustion mode of compression-igniting lean air-fuel mixture is known. Increasing a geometric compression ratio in an engine where such a compression-ignition combustion is performed leads to increasing a pressure and a temperature at the end of compression stroke and, therefore, is advantageous in stabilizing a compression-ignition combustion.

Meanwhile, although a spark-ignition gasoline engine such as the one disclosed in JP2007-292050A is advantageous in improving the thermal efficiency, there has been a problem that when an operating state of the engine is especially within a low engine speed range and a middle or high engine load range, an abnormal combustion such as a pre-ignition and knocking (spark-knock) is easily caused.

Further, with an engine where a compression ignition combustion is performed, even if the compression-ignition combustion can be performed within an operating range where an engine load is low, as the engine load increases, the compression-ignition combustion turns into a combustion caused by a pre-ignition where an increase in pressure is rapid. Therefore, a combustion noise becomes louder and the abnormal combustion such as knocking is caused, at the same time, Raw NOx is increased due to a high temperature combustion temperature. Thus, as disclosed in JP2007-154859A, even with the engine where the compression-ignition combustion is performed, within the operating range where the engine load is high, the compression-ignition combustion is not performed but a spark-ignition combustion by operating an ignition plug is generally performed. However, with an engine where a geometric compression ratio is set high so that the compression-ignition combustion is stabilized, within an operating range where an engine speed is high, where a spark-ignition combustion is performed, a problem that an abnormal combustion is caused similarly to the engine in JP2007-292050A arises.

The present invention is made in view of the above situations and avoids an abnormal combustion in a spark-ignition gasoline engine with a high compression ratio in which a geometric compression ratio is set comparatively high, for example 14:1, when the engine is within a high load range.

An abnormal combustion such as a pre-ignition and knocking corresponds to a self-ignition reaction due to unburned air-fuel mixture being compressed during a compression stroke and a self-ignition reaction due to an unburned part of the air-fuel mixture being compressed by an expansion of a burned part thereof while the air-fuel mixture is burned. With the conventional engine where fuel is injected thereinto during an intake stroke, one of the factors that cause such an abnormal combustion is a long unburned air-fuel mixture reactable time, in other words, a time length from the start of the fuel injection until the end of combustion.

The reactable time of the unburned air-fuel mixture is configured by three periods: an injection period in which a fuel injection valve injects the fuel, an air-fuel mixture forming period starting from when the fuel injection completes until when a combustible air-fuel mixture is formed around the ignition plug, and a combustion period from when the combustion starts by the combustible air-fuel mixture being ignited around the ignition plug to when the combustion ends. Through studying a measure for shortening these respective three periods, it has been found that injecting the fuel into a cylinder at a timing near a compression top dead center with a comparatively high fuel pressure shortens the injection, air-fuel mixture forming, and combustion periods, respectively, and, as a result, leads to the completion of the present invention.

Means for Solving the Problems

Specifically, a control device of a spark-ignition gasoline engine disclosed here includes an engine body having a cylinder of which a geometric compression ratio is set to 14:1 or above, and for being supplied with fuel containing at least gasoline, a fuel injection valve for injecting the fuel into the cylinder, an ignition plug arranged to be oriented inside the cylinder and for igniting air-fuel mixture within the cylinder, a fuel pressure variable mechanism for changing a pressure of the fuel that is injected by the fuel injection valve, and a controller for operating the engine body by controlling at least the fuel injection valve, the ignition plug, and the fuel pressure variable mechanism.

When an operating state of the engine body is within a low engine speed range, the controller controls the fuel pressure variable mechanism so that the fuel pressure is higher within a high engine load range compared to a low engine load range, the controller operates, within the high engine load range, the fuel injection valve to perform a fuel injection at least at a timing that is more retarded than an injection timing of the fuel within the low engine load range and is during a retard period from the late stage of a compression stroke to the early stage of an expansion stroke, and the controller operates, within the high engine load range, the ignition plug to ignite at a timing during the retard period and after the fuel injection.

Here, the geometric compression ratio of the engine body may be set within a range from 14:1 to, for example, 20:1.

Further, the "low engine load range" and "high engine load range" may be, in a case where an operating range of the engine body is divided into two according to the level of the engine load, ranges on a low engine load side and a high engine load side, respectively.

The "low engine speed range" may be, in a case where the operating range of the engine body is divided into two according to the level of the engine speed, a range on a low engine speed side, or may be, in a case where the operating range of the engine body is divided into three: low, middle and high engine speed ranges, a low engine speed range.

The "late stage of the compression stroke" may be, in a case where the compression stroke is divided into three: the early, middle and late stages, a late stage, and similarly, the "early stage of the expansion stroke" may be, in a case where the expansion stroke is divided into three: the early, middle and late stages, the early stage.

When the operating range of the engine body is within the high engine load range of the low engine speed range, an actual time length required for a change of a crank angle becomes longer and a pressure and a temperature inside the cylinder increase, thereby an abnormal combustion such as a pre-ignition or knocking easily occurs. Because the engine body of the above described configuration has a high compression ratio, when the operating range of the engine body is within the high engine load range of the low engine speed range, the abnormal combustion further easily occurs.

In the control device of the engine with the above configuration, within such a high engine load range of the low engine speed range, the controller controls the fuel pressure to be higher compared to a case of the low engine load range. The high fuel pressure relatively increases a fuel amount injected per unit time. Thereby, when comparing with same amount of fuel injection, the high fuel pressure shortens a period of injecting the fuel into the cylinder, that is, an injection period, compared to the low fuel pressure.

Moreover, the high fuel pressure is advantageous in atomizing an atomized fuel injected into the cylinder and also extends a spreading distance of the atomized fuel. Thus, the high fuel pressure shortens a period starting from when the fuel injection completes until when a combustible air-fuel mixture is formed around the ignition plug (an air-fuel mixture forming period).

An end timing of the air-fuel mixture forming period is substantially the same as an injection timing set near a compression top dead center, therefore, shortening the injection period and the air-fuel mixture forming period, as described above, allow the injection timing of the fuel (more accurately, an injection start timing) to be set at a comparatively late timing. Thus, in the above configuration, at the timing during the retard period from the late stage of the compression stroke to the early stage of the expansion stroke, the fuel injection with high fuel pressure is performed.

Accompanying the injection of the fuel into the cylinder with the high fuel pressure, a turbulence inside the cylinder becomes strong and a turbulence kinetic energy inside the cylinder increases. The high turbulence kinetic energy, together with the timing of the fuel injection being set to the comparatively late timing, contributes in shortening a combustion period.

That is, even if the fuel is injected into the cylinder with the high fuel pressure, in the case where the injection timing is during the intake stroke similarity to the conventional case, due to the time length until the ignition timing being long and inside the cylinder being compressed on the compression stroke after the intake stroke, the turbulence inside the cylinder is subsided and the turbulence kinetic energy inside the cylinder during the combustion period becomes comparatively low. A higher level of the turbulence kinetic energy inside the cylinder is further advantageous in shortening the combustion period, therefore, even if the fuel is injected into the cylinder with the high fuel pressure, as long as the injection timing is during the intake stroke, the turbulence kinetic energy does not contribute greatly in shortening the combustion period.

On the other hand, as the above described configuration, injecting the fuel into the cylinder with the high fuel pressure at the comparatively late timing during the retard period allows the combustion to be started while suppressing the subsiding of the turbulence inside the cylinder, thus, the turbulence kinetic energy inside the cylinder during the combustion period increases. Thereby, the combustion period becomes shorter.

As above, performing the fuel injection into the cylinder with the high fuel pressure during the retard period, where the timing is comparatively late, allows each of the injection period, air-fuel mixture forming period, and the combustion period to be shortened. As a result, a reactable time of the unburned air-fuel mixture is greatly shortened compared to the conventional case, and the abnormal combustion such as the pre-ignition and knocking can effectively be avoided.

Further, in the above configuration, the abnormal combustion is avoided by devising a mode of the fuel injection into the cylinder, thereby, retarding the ignition timing for a purpose of avoiding the abnormal combustion is not required or a retarding amount can be reduced. Thereby, the ignition timing can be advanced as much as possible, thus, the above configuration is advantageous in improving a thermal efficiency and increasing a torque, in other words, improving a fuel consumption, as well as avoiding the abnormal combustion.

When the operating state of the engine body is within the high engine load range of the low engine speed range, the controller may retard the injection timing of the fuel and the timing of the ignition as the engine load increases.

The temperature and pressure inside the cylinder are increased as the engine load increases and a fuel concentration becomes higher, thereby, the abnormal combustion more easily occurs. Thus, to further shorten a reaction time of the unburned air-fuel mixture, the injection timing and ignition timing of the fuel are desirably retarded, respectively. This retard achieves to surely avoid the abnormal combustion. On the other hand, because the abnormal combustion becomes harder to occur as the engine load becomes lower, the injection timing and ignition timing of the fuel are advanced, respectively, by an amount with which the abnormal combustion can be avoided. This becomes advantageous in improving the fuel consumption.

When the operating state of the engine body is within the high engine load range of the low engine speed range, the controller may operate the engine body at an air-fuel ratio of $\lambda=1$.

An operation at a theoretical air-fuel ratio shortens the combustion period compared to a lean operation. Therefore, the reactable time of the unburned air-fuel mixture is shortened and becomes advantageous in avoiding the abnormal combustion.

Moreover, operating the engine body at the theoretical air-fuel ratio allows a three-way catalyst to be utilized. Thus, the operation at $\lambda=1$ becomes advantageous in improving an emission performance when the operating state of the engine body is within the high engine load range of the low engine speed range.

When the operating state of the engine body is within the high engine load range of the low engine speed range, the fuel pressure variable mechanism may set the fuel pressure to 40 MPa or above.

The fuel pressure of 40 MPa or above can effectively achieve shortening all of the injection period, the air-fuel mixture forming period, and the combustion period. As a result, avoiding the abnormal combustion can be achieved. Note that, a maximum value of the fuel pressure can be set according to a characteristic of the fuel. For example, although it is not limited to this, the maximum value of the fuel pressure may be set to about 120 MPa.

The fuel injection valve may be formed with a plurality of nozzle holes so that the atomized fuel that is injected from the nozzle holes radially spreads within the cylinder.

The fuel injection valve having the plurality of nozzle holes becomes advantageous in improving the turbulence kinetic energy inside the cylinder. Therefore, the fuel injection valve having the plurality of nozzle holes is advantageous in shortening the combustion period.

The fuel injection valve may be arranged in a center portion of a ceiling part of a combustion chamber defined by the cylinder, a piston inserted in the cylinder, and a cylinder head.

The piston may be formed with a cavity on a top face thereof. The atomized fuel injected during the retard period may be accommodated within the cavity.

A combination of the fuel injection valve arranged in the center portion of the ceiling part and the cavity formed on the top face of the piston further shortens the air-fuel mixture forming period and the combustion period, thereby, becomes advantageous in avoiding the abnormal combustion.

The control device of the spark-ignition gasoline engine may further include an EGR passage for circulating a part of burned gas on an exhaust side of the engine body back to an intake side thereof. When the operating state of the engine body is within the high engine load range of the low engine speed range from which at least a full engine load is excluded, the controller may perform the exhaust gas re-circulation via the EGR passage.

That is, when the operating state of the engine body is within the high engine load range of the low engine speed range from which at least the full engine load is excluded, an EGR gas may be introduced into the cylinder by utilizing an external EGR. This operation avoids the abnormal combustion and also suppresses generation of Raw NOx, and further contributes in improving the fuel consumption by, for example, a pumping loss and a cooling loss.

When the operating state of the engine body is within the high engine load range of the low engine speed range, the controller may operate the fuel injection valve to perform a plurality of fuel injections during the retard period.

A fuel injection performed at a relatively early timing among the plurality of fuel injections that are separately performed can secure a long air-fuel mixture forming period, and thereby, becomes advantageous in vaporizing and atomizing the fuel. Because such a sufficient air-fuel mixture forming period is secured, the fuel injection at a relatively late timing can be performed at a further retarded timing. This becomes advantageous in increasing the turbulence kinetic energy inside the cylinder and the combustion period is further shortened.

The controller may operate the fuel injection valve to perform, during the retard period, two fuel injections including a first injection and a following second injection, in which a fuel injection amount in the second injection is larger than a fuel injection amount in the first injection.

That is, relatively increasing the fuel injection amount of the second injection between the two fuel injections performed during the retard period sufficiently increases the turbulence kinetic energy inside the cylinder as described above and becomes advantageous in shortening the combustion period and eventually in avoiding the abnormal combustion.

When the operating state of the engine body is within the low engine load range of the low engine speed range, the controller operates the fuel injection valve to form a stratified lean air-fuel mixture within the cylinder by injecting the fuel during the compression stroke, and operates the ignition plug to ignite the stratified lean air-fuel mixture at a predetermined timing.

That is, the above described art may be applied to an engine for performing a spark-ignition combustion within an entire range of the operating range of the engine body. The engine body is, because the geometric compression ratio is high, advantageous in improving the thermal efficiency.

When the operating state of the engine body is within the low engine load range of the low engine speed range, the controller may operate the fuel injection valve to inject the fuel at a timing more advanced than the fuel injection timing during the retard period, and may compression-ignite the air-fuel mixture within the cylinder by allowing a part of the burned gas of the engine body to exist within the cylinder.

Performing the compression ignition combustion when the operating state of the engine body is within the low engine load range of the low engine speed range becomes advantageous in improving the exhaust emission and the thermal efficiency. Especially, this engine body is a high compression ratio engine of which the geometric compression ratio is set to 14:1 or above, therefore, a stabilized compression spark-ignition can be performed.

When the operating state of the engine body is within the low engine load range of the low engine speed range, the controller may control at least either one of an intake valve and an exhaust valve attached to the engine body to substantially leave the part of the burned gas within the cylinder.

That is, when the compression ignition combustion is performed, the high temperature burned gas is left inside the cylinder by utilizing an internal EGR. Thereby, the temperature at the end of the compression stroke is increased, and thus, leaving the burned gas is advantageous in stabilizing the compression ignition combustion.

BRIEF DESCRIPTION OF THE DRAWINGS

FIGS. 18A-18G are characteristic charts of parameters calculated according to the flow in FIG. 17.

DESCRIPTION OF THE EMBODIMENTS

Figure 1:
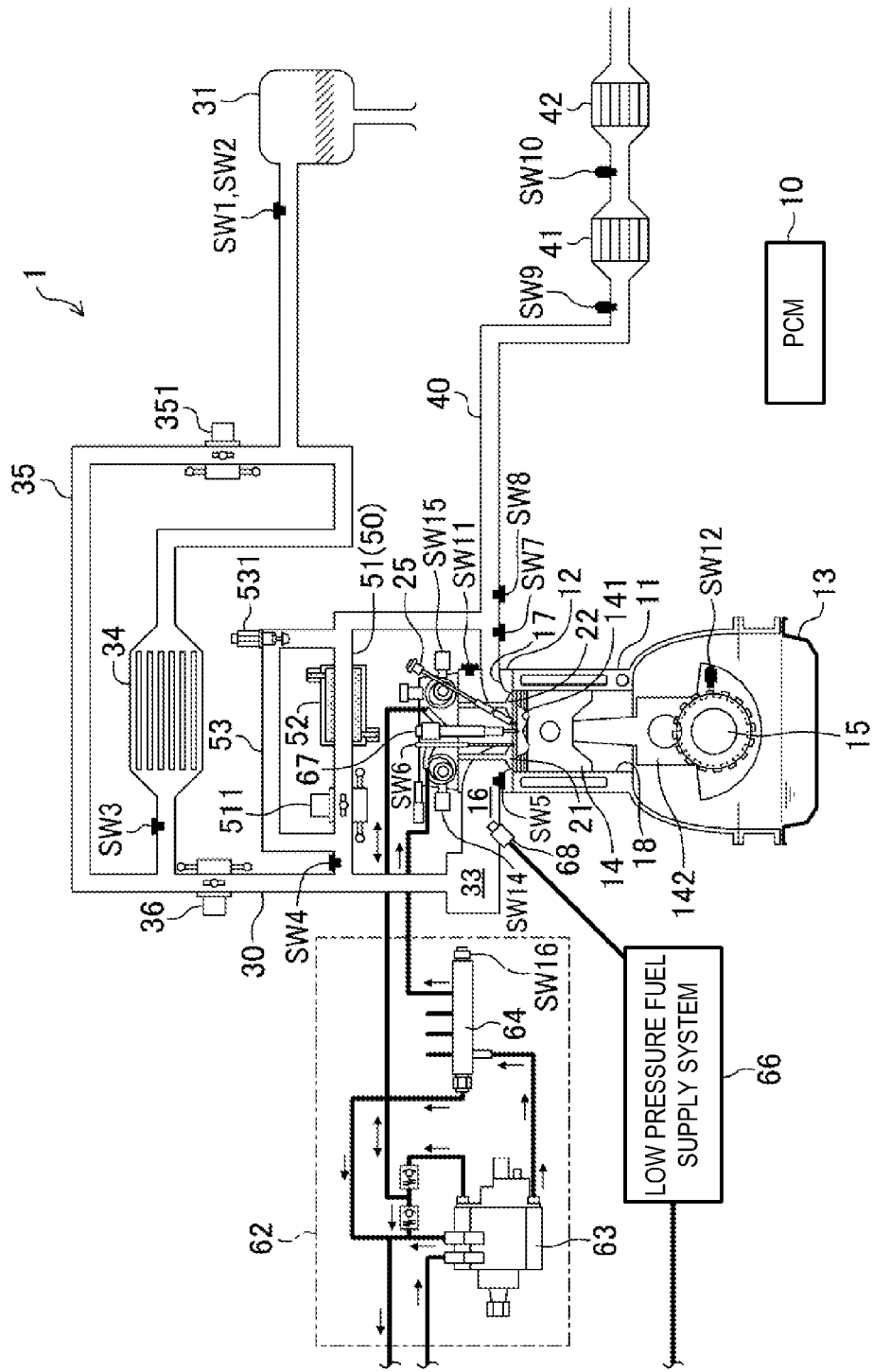
FIG. 1 is a schematic diagram showing a configuration of a spark-ignition gasoline engine.
Figure 2:
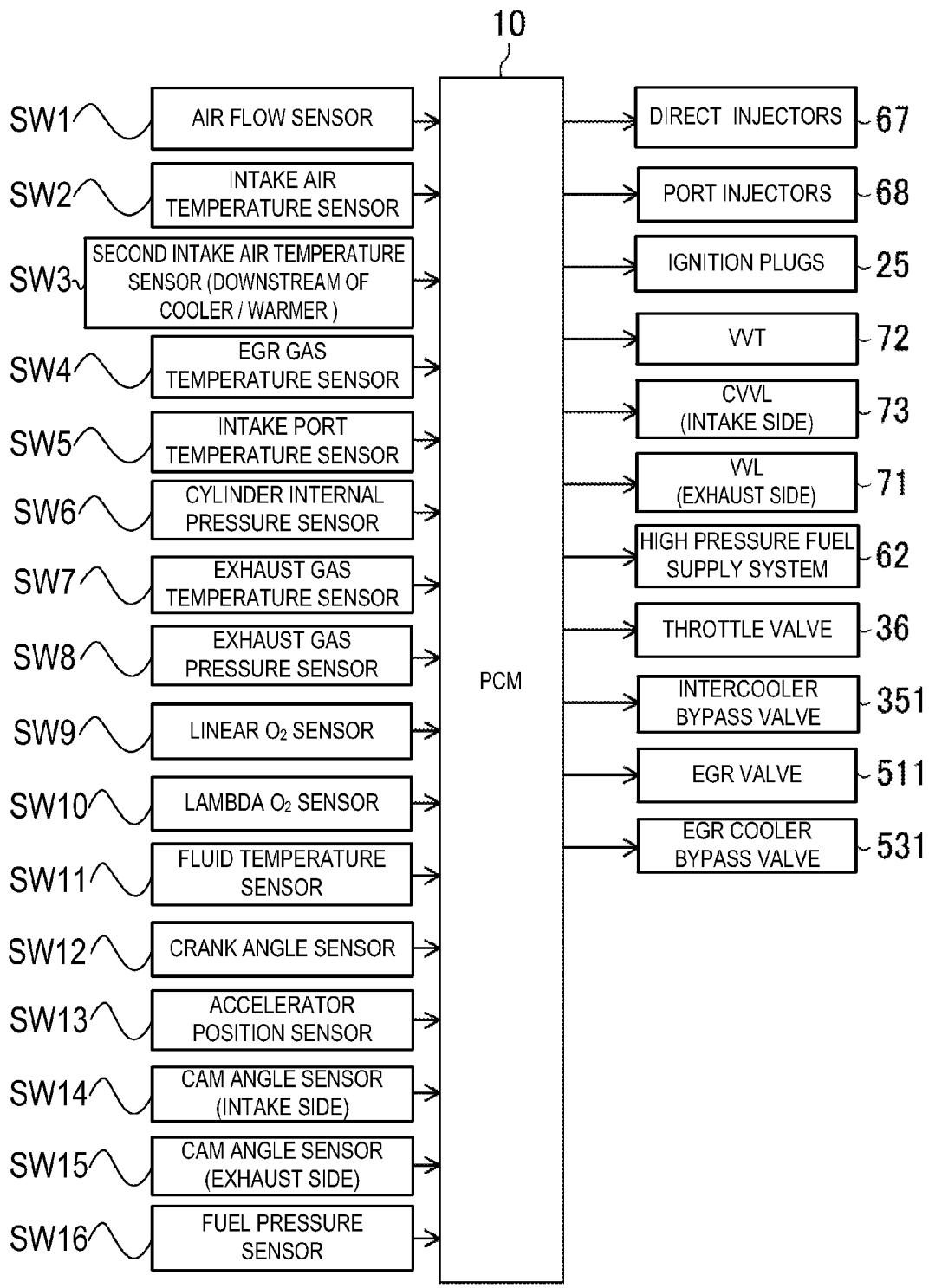
FIG. 2 is a block diagram relating to a control of the spark-ignition gasoline engine.
Figure 3:
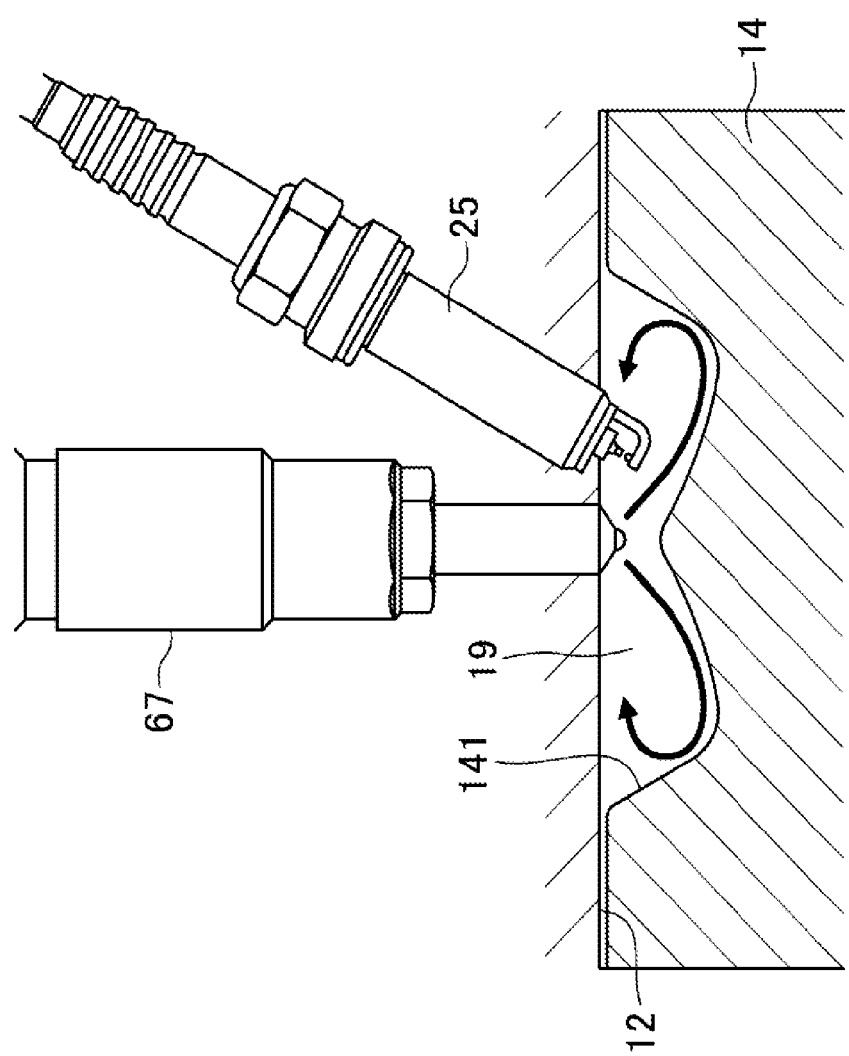
FIG. 3 is an enlarged cross-sectional view showing a combustion chamber.

Hereinafter, a control device of a spark-ignition gasoline engine according to an embodiment of the present invention is described in detail with reference to the appended drawings. The following description of the preferred embodiments is an illustration. FIGS. 1 and 2 show a schematic configuration of an engine 1 (engine body) of this embodiment. The engine 1 is a spark-ignition gasoline engine that is mounted in a vehicle and supplied with fuel at least containing gasoline. The engine 1 includes a cylinder block 11 provided with a plurality of cylinders 18 (only one cylinder is illustrated), a cylinder head 12 arranged on the cylinder block 11, and an oil pan 13 arranged below the cylinder block 11 and where a lubricant is stored. Inside the cylinders 18, reciprocating pistons 14 coupled to a crank shaft 15 via connecting rods 142, respectively, are fitted. As shown in FIG. 3 in an enlarged manner, a cavity 141 in a reentrant shape is formed on a top face of each piston 14. When the piston 14 is at a position near a compression top dead center, the cavity 141 faces toward a direct injector 67 described later. The cylinder head 12, the cylinders 18, and the pistons 14 each formed with the cavity 141 partition the combustion chambers 19. Note that, the shape of the combustion chamber 19 is not limited to the shape in illustration. For example, the shape of the cavity 141, a shape of the top face of the piston 14, a shape of a ceiling part of the combustion chamber 19 may suitably be changed.

A geometric compression ratio of the engine 1 is set comparatively high to be 14:1 or above so as to improve a theoretical thermal efficiency and stabilize a compression-ignition combustion (described later). Note that, the geometric compression ratio may suitably be set within a range of 14:1 to 20:1.

In the cylinder head 12, an intake port 16 and an exhaust port 17 are formed, and an intake valve 21 for opening and closing the opening of the intake port 16 on the combustion chamber 19 side and an exhaust valve 22 for opening and closing the opening of the exhaust port 17 on the combustion chamber 19 side are arranged for each of the cylinders 18.

Within a valve train system of the engine 1 for operating the intake and exhaust valves 21 and 22, a mechanism such as a hydraulically-actuated variable valve mechanism 71 (see FIG. 2, hereinafter, it may be referred to as the VVL (Variable Valve Lift)) for switching an operation mode of the exhaust valve 22 between a normal mode and a special mode is provided on an exhaust side. The VVL 71 (a detailed configuration is not illustrated) is configured to include two kinds of cams with cam profiles different from each other in which a first cam has one cam nose and a second cam has two cam noses; and a lost motion mechanism for selectively transmitting an operation state of either one of the first and second cams to the exhaust valve 22. When the lost motion mechanism transmits the operation state of the first cam to the exhaust valve 22, the exhaust valve 22 operates in the normal mode where it opens only once during exhaust stroke (see the parts (c) and (d) in FIG. 10). On the other hand, when the lost motion mechanism transmits the operation state of the second cam to the exhaust valve 22, the exhaust valve 22 operates in the special mode where it opens during the exhaust stroke and further during intake stroke once each, that is the exhaust valve opens twice (see the parts (a) and (b) in FIG. 10). The normal and special modes of the VVL 71 are switched therebetween according to an operating state of the engine. Specifically, the special mode is utilized for a control related to an internal EGR. Note that, an electromagnetically-operated valve system for operating the exhaust valve 22 by using an electromagnetic actuator may be adopted for switching between the normal and special modes. Further, the execution of the internal EGR is not limited to opening the exhaust valve 22 twice, and it may be accomplished through, for example, an internal EGR control by opening the intake valve 21 twice or through an internal EGR control where the burned gas is left in the cylinder 18 by setting a negative overlap period where both of the intake and exhaust valves 21 and 22 are closed during the exhaust stroke or the intake stroke.

While the valve system on the exhaust side is provided with the VVL 71, as shown in FIG. 2, a phase variable mechanism 72 (hereinafter, it may be referred as the VVT (Variable Valve Timing)) for changing a rotation phase of an intake camshaft with respect to the crank shaft 15 and a lift variable mechanism 73 (hereinafter, it may be referred as the CVVL (Continuously Variable Valve Lift) for continuously changing a lift of the intake valve 21 are provided on an intake side of the valve system. A well-known hydraulic, electromagnetic or mechanical structure may suitably be adopted for the VVT 72 (a detailed structure is not illustrated). Further, various kinds of well-known structures may suitably be adopted for the CVVL 73 (a detailed structure is not illustrated). As shown in the parts (a) to (d) in FIG. 10, opening and closing timings, and the lift of the intake valve 21 can be changed by the VVT 72 and the CVVL 73, respectively.

The direct injector 67 for directly injecting the fuel into the cylinder 18 and a port injector 68 for injecting the fuel into the intake port 16 are attached to the cylinder head 12, for each cylinder 18.

As shown in an enlarged manner in FIG. 3, a nozzle hole of the direct injector 67 is arranged in a center part of the ceiling surface of the combustion chamber 19 to be oriented toward the combustion chamber 19. The direct injector 67 directly injects the fuel into the combustion chamber 19 by an amount according to the operating state of the engine 1 at an injection timing according to the operating state of the engine 1. In this embodiment, the direct injector 67 (a detailed configuration is omitted) is a multi hole injector formed with a plurality of nozzle holes. Thereby, the direct injector 67 injects the fuel so that the atomized fuel spreads radially. As indicated by the arrows in FIG. 3, at a timing corresponding to the piston 14 reaching the position near the compression top dead center, the atomized fuel injected from the center part of the combustion chamber 19 to spread radially flows along a wall surface of the cavity 141 formed on the piston top face, thereby, the atomized fuel reaches the periphery of an ignition plug 25 described later. Therefore, it may be said that the cavity 141 is formed to accommodate the atomized fuel injected at the timing corresponding to the position of the piston 14 reaching the position near the compression top dead center therewithin. The combination of the multi hole injector 67 and the cavity 141 is advantageous in shortening a time length from the injection of the fuel until the atomized fuel reaches the periphery of the ignition plug 25, and is advantageous in shortening the combustion period. Note that, the direct injector 67 is not limited to the multi hole injector, and an outward opening valve type injector may be adopted to the direct injector 67.

As shown in FIG. 1, the port injector 68 is arranged to be oriented toward the intake port 16 or an independent passage communicating with the intake port 16 and injects the fuel into the intake port 16. One port injector 68 may be provided for each cylinder 18 or, if the intake port 16 includes two ports for each cylinder 18, the port injector 68 may be provided for each of the two intake ports 16. A type of the port injector 68 is not limited to a particular type, and various types of injectors may suitably be adopted.

A high pressure fuel supply path couples between a fuel tank (provided in a position out of the range in the illustration) and the direct injectors 67. A high pressure fuel supply system 62 having a high pressure fuel pump 63 and a common rail 64 and for supplying the fuel to each of the direct injectors 67 with a relatively high fuel pressure is provided within the high pressure fuel supply path. The high pressure fuel pump 63 pumps the fuel from the fuel tank to the common rail 64, and the common rail 64 accumulates the pumped fuel with a high fuel pressure. By opening the nozzle holes of the direct injector 67, the fuel accumulated in the common rail 64 is injected from the nozzle holes of the direct injector 67. Here, the high pressure fuel pump 63 (the illustration thereof is omitted in the drawings) is a plunger type pump, and by being coupled, for example, to a timing belt between the crank shaft and the camshaft and, is operated by the engine 1. The high pressure fuel supply system 62 including the engine-operated pump enables the supply of fuel with a high fuel pressure, that is, 40 MPa or above, to each of the direct injectors 67. As described later, the pressure of the fuel to be supplied to the direct injector 67 is changed according to the operating state of the engine 1. Note that, the high pressure fuel supply system 62 is not limited to the above configuration.

Similarly, a low pressure fuel supply path couples between the fuel tank (provided in a position out of the range in the illustration) and the port injectors 68. A low pressure fuel supply system 66 for supplying the fuel with a relatively low fuel pressure to each of the port injectors 68 is provided within the low pressure fuel supply path. The low pressure fuel supply system 66 (the illustration thereof is omitted in the drawings) includes an electrically-operated or engine-operated low pressure fuel pump and a regulator, and is configured to supply the fuel with a predetermined pressure to each port injector 68. The port injector 68 injects the fuel to the intake port, and therefore the pressure of the fuel that is supplied from the low pressure fuel supply system 66 is set lower than the pressure of the fuel that is supplied from the high pressure fuel supply system 62.

Further, in the cylinder head 12, the ignition plug 25 for igniting the air-fuel mixture inside the combustion chamber 19 is attached for each cylinder 18. The ignition plug 25 is attached, penetrating the cylinder head 12 so as to extend obliquely downward from the exhaust side of the engine 1. As shown in FIG. 3, a tip of the ignition plug 25 is oriented in proximity to a tip of the direct injector 67 arranged in the center part of the combustion chamber 19, and oriented toward the combustion chamber 19.

On one side surface of the engine 1, an intake passage 30 is connected to communicate with each of the intake ports 16 of the cylinders 18. On the other side of the engine 1, an exhaust passage 40 for discharging the burned gas (exhaust gas) from each of the combustion chambers 19 of the cylinders 18 is connected.

An air cleaner 31 for filtrating intake air is arranged in an upstream end part of the intake passage 30. A surge tank 33 is arranged near a downstream end of the intake passage 30. A part of the intake passage 30 on the downstream side of the surge tank 33 is branched to be independent passages extending toward the respective cylinders 18, and downstream ends of the independent passages are connected with the respective intake ports 16 for each of the cylinders 18.

A water-cooled type intercooler/warmer 34 for cooling or heating air and a throttle valve 36 for adjusting an intake air amount to each cylinder 18 are arranged between the air cleaner 31 and the surge tank 33 in the intake passage 30. Further, an intercooler/warmer bypass passage 35 for bypassing the intercooler/warmer 34 is connected within the intake passage 30, and an intercooler bypass valve 351 for adjusting an air flow rate passing through the passage 35 is arranged within the intercooler/warmer bypass passage 35. A ratio of a flow rate through the intercooler/warmer bypass passage 35 and a flow rate through the intercooler/warmer 34 is adjusted through adjusting an opening of the intercooler/warmer bypass valve 351, and thereby, a temperature of new air to be introduced into the cylinder 18 is adjusted.

A part of the exhaust passage 40 on the upstream side is constituted with an exhaust manifold having independent passages branched toward the cylinders 18, respectively, and connected with outer ends of the exhaust ports 17 and a merging part where the independent passages merge together. In a part of the exhaust passage 40 on the downstream of the exhaust manifold, a direct catalyst 41 and an underfoot catalyst 42 are connected as an exhaust emission control system for purifying hazardous components contained in the exhaust gas. Each of the direct catalyst 41 and the underfoot catalyst 42 includes a cylinder case and, for example, a three-way catalyst arranged in a flow passage within the case.

A part of the intake passage 30 between the surge tank 33 and the throttle valve 36 and a part of the exhaust passage 40 upstream of the direct catalyst 41 are connected with each other via an EGR passage 50 for re-circulating a part of the exhaust gas to the intake passage 30. The EGR passage 50 includes a main passage 51 arranged with an EGR cooler 52 for cooling the exhaust gas by an engine coolant, and an EGR cooler bypass passage 53 for bypassing the EGR cooler 52. An EGR valve 511 for adjusting a re-circulation amount of the exhaust gas to the intake passage 30 is arranged within the main passage 51 and an EGR cooler bypass valve 531 for adjusting a flow rate of the exhaust gas flowing through the EGR cooler bypass passage 53 is arranged within the EGR cooler bypass passage 53.

The diesel engine 1 with the configuration described as above is controlled by a powertrain control module 10 (hereinafter, it may be referred to as the PCM). The PCM 10 is configured by a CPU, a memory, a counter timer group, an interface, and a microprocessor with paths for connecting these units. The PCM 10 is configured as a controller.

As shown in FIGS. 1 and 2, detection signals of various kinds of sensors SW1 to SW16 are inputted to the PCM 10. The various kinds of sensors include sensors as follows: an air flow sensor SW1 for detecting the flow rate of the new air and an intake air temperature sensor SW2 for detecting the temperature of the new air that are arranged on the downstream of the air cleaner 31; a second intake air temperature sensor SW3 arranged on the downstream of the intercooler/warmer 34 and for detecting the temperature of the new air after passing through the intercooler/warmer 34; an EGR gas temperature sensor SW4 arranged close to a connection part of the EGR passage 50 with the intake passage 30 and for detecting the temperature of external EGR gas; an intake port temperature sensor SW5 attached to the intake port 16 and for detecting the temperature of the intake air immediately before flowing into the cylinder 18; a cylinder internal pressure sensor SW6 attached to the cylinder head 12 and for detecting the pressure inside the cylinder 18; an exhaust gas temperature sensor SW7 and an exhaust gas pressure sensor SW8 arranged close to a connection part of the exhaust passage 40 with the EGR passage 50 and for detecting the exhaust gas temperature and pressure, respectively; a linear $O_2$ sensor SW9 arranged on the upstream side of the direct catalyst 41 and for detecting an oxygen concentration within the exhaust gas; a lambda $O_2$ sensor SW10 arranged between the direct catalyst 41 and the underfoot catalyst 42 and for detecting the oxygen concentration within the exhaust gas; a fluid temperature sensor SW11 for detecting a temperature of the engine coolant; a crank angle sensor SW12 for detecting a rotational angle of the crank shaft 15; an accelerator position sensor SW13 for detecting an accelerator opening amount corresponding to an angle of an acceleration pedal (not illustrated) of the vehicle; cam angle sensors SW14 and SW 15 on the intake and exhaust sides, respectively; and a fuel pressure sensor SW16 attached to the common rail 64 of the high pressure fuel supply system 62 and for detecting the fuel pressure to be supplied to the direct injector 67.

By performing various kinds of operations based on these detection signals, the PCM 10 determines states of the engine 1 and the vehicle, and further outputs control signals to the direct injectors 67, the port injectors 68, the ignition plugs 25, the VVT 72 and CVVL 73 on the intake valve side, the VVL 71 on the exhaust valve side, the high pressure fuel supply system 62, and the actuators of the various kinds of valves (throttle valve 36, intercooler bypass valve 351, the EGR valve 511, and the EGR cooler bypass valve 531) according to the determined states. Thereby, the PCM 10 operates the engine 1.

Figure 4:
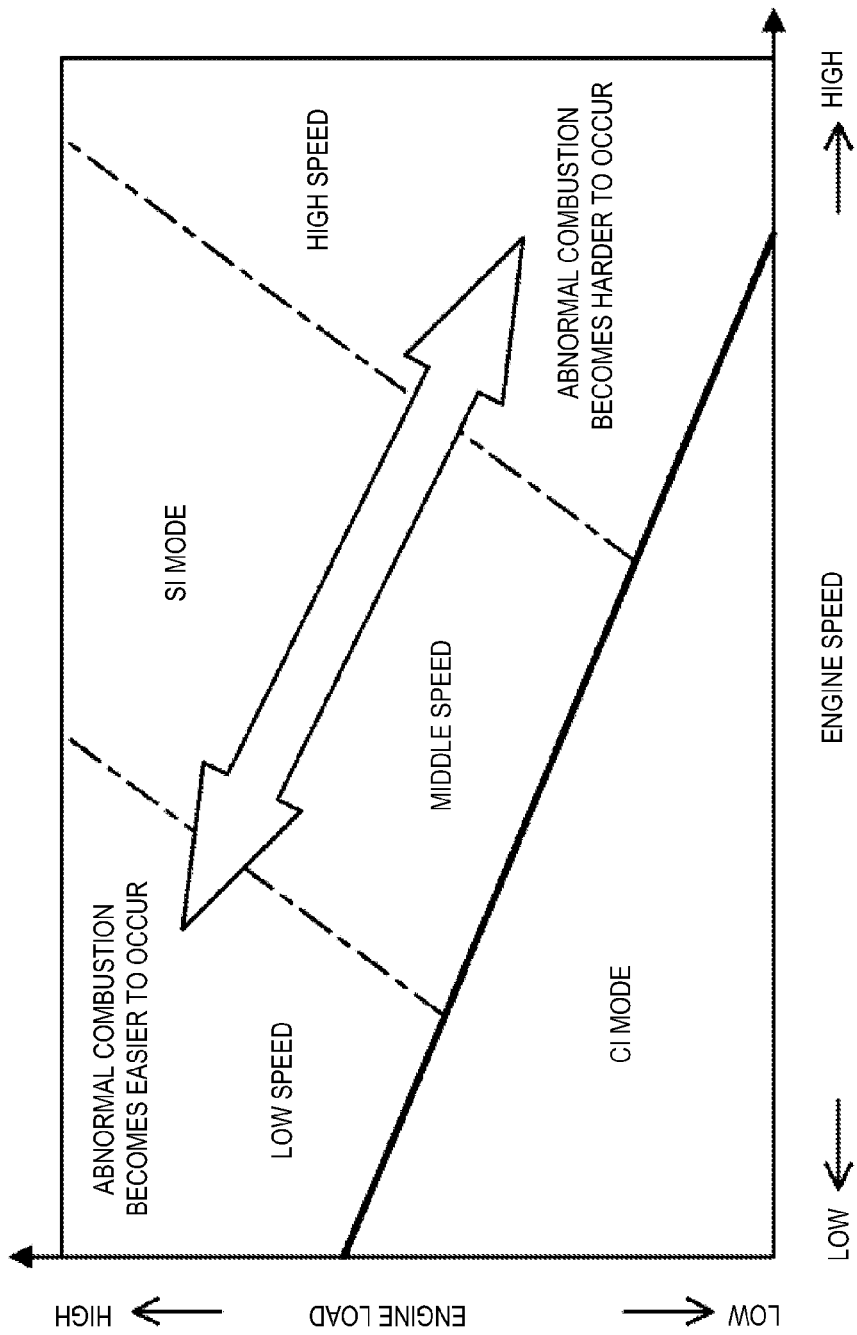
FIG. 4 is a chart exemplifying an operating range of the engine.

FIG. 4 shows an example of an operating range of the engine 1. Within a low engine load range where an engine load is relatively low, the engine 1 doesn't perform ignitions by the ignition plugs 25 and performs a compression-ignition combustion in which a combustion is generated by a compression self-ignition so as to improve fuel consumption and exhaust emission performance. However, with the compression-ignition combustion, the speed of the combustion becomes excessively rapid as the load of the engine 1 increases, and thereby, causes a problem of, for example, a combustion noise. Therefore, with the engine 1, within a high engine load range where the engine load is relatively high, the compression-ignition combustion is stopped and is switched to a spark-ignition combustion using the ignition plugs 25. Further, with the compression-ignition combustion, a reaction time allowance becomes shorter as a speed of the engine 1 increases and the compression-ignition of the engine becomes difficult or impossible to be performed. Thus, with the engine 1, even within the relatively low engine load range, within a high engine speed range, the spark-ignition combustion is performed. Therefore, the engine 1 is configured to switch a mode between a CI (Compression Ignition) mode where the compression-ignition combustion is performed and an SI (Spark Ignition) mode where the spark-ignition combustion is performed. A boundary line for switching the combustion mode between the CI mode and the SI mode is set comparatively downward to the right within a map of the engine speed and load shown in FIG. 4. Note that, the boundary line is not limited to this in the illustration.

In the CI mode (described in detail later), basically, the direct injector 67 injects the fuel inside the cylinder 18 at a comparatively early timing, for example, during either one of the intake stroke and compression stroke, thereby, forms a comparatively homogeneous lean air-fuel mixture, and further the air-fuel mixture compression self-ignites near a compression top dead center. Meanwhile, in the SI mode, basically, the direct injector 67 injects the fuel inside the cylinder 18 during either one of the intake stroke and the compression stroke, thereby, forms a homogenized or stratified lean air-fuel mixture, and further, by performing an ignition near the compression top dead center, the air-fuel mixture is ignited. Moreover, in the SI mode, the engine 1 is operated with a theoretical air-fuel ratio ($\lambda=1$). Thereby, the three-way catalyst can be used, and this becomes advantageous in improving the emission performance.

As described above, the geometric compression ratio of the engine 1 is set to be 14:1 or above (for example, 18:1). Because the high compression ratio increases a temperature and a pressure at the end of compression stroke, it is advantageous in stabilizing the compression-ignition combustion in the CI mode. Whereas, because, within the high engine load range, the high compression ratio engine 1 switches the combustion mode to the SI mode, particularly within a low engine speed range, there is an inconvenience that an abnormal combustion such as a pre-ignition and knocking easily occurs as the engine load increases (see the white arrow in FIG. 4).

Thus, with the engine 1, when the operating state of the engine is within the high engine load range of the low engine speed range, by performing the SI combustion where an injection mode of the fuel is greatly differed from the conventional mode, the abnormal combustion is avoided. Specifically, in the injection mode of the fuel of this embodiment, within a period between the late stage of the compression stroke and the early stage of expansion stroke, that is a period significantly retarded compared to the conventional mode (hereinafter, the period is referred to as the retard period), the fuel injection to the cylinder 18 is performed by the direct injector 67. Hereinafter, this characteristic fuel injection mode is referred to as the "high pressure retarded injection."

Figure 5:
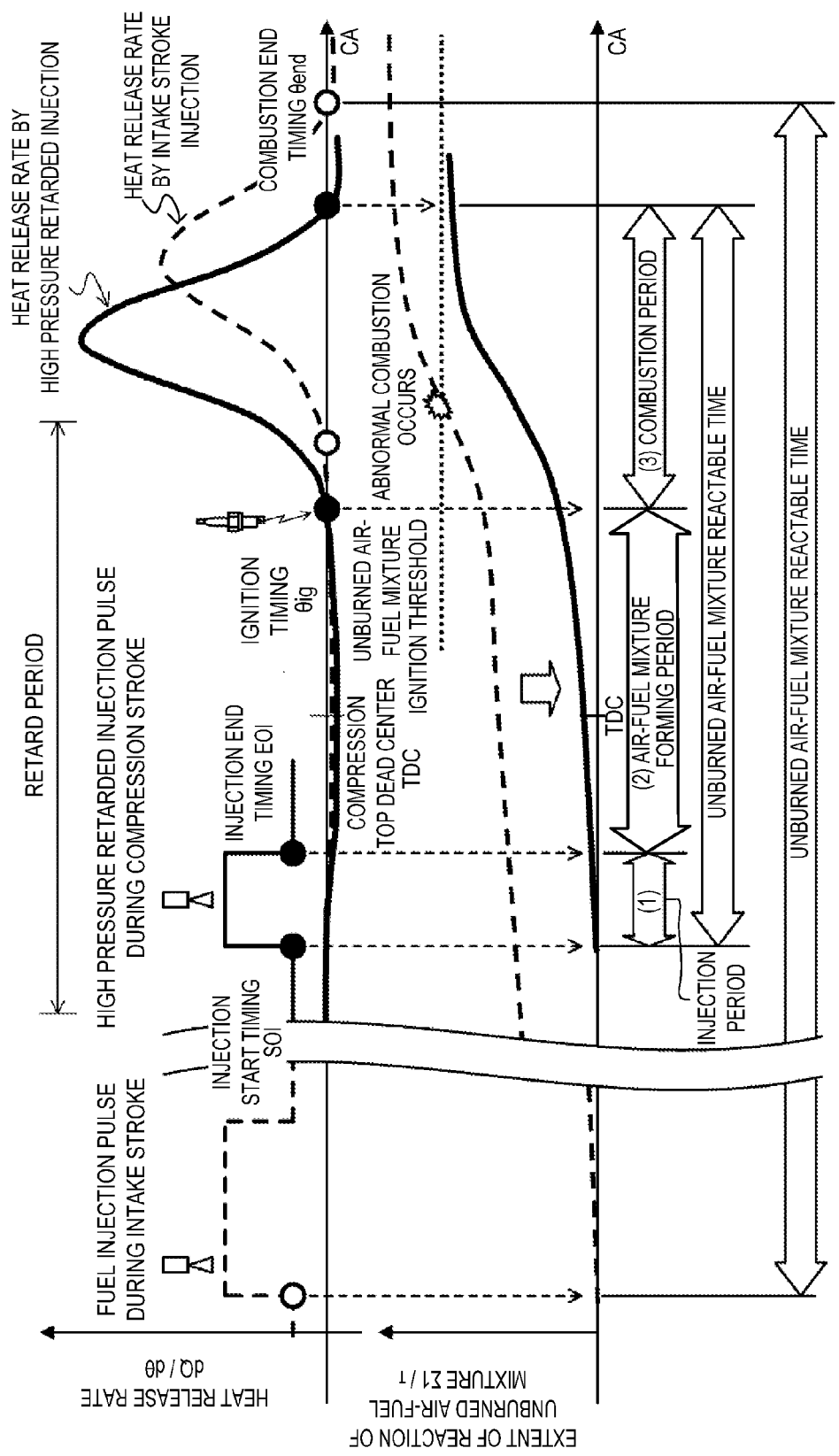
FIG. 5 is a chart comparing a state of an SI combustion by a high pressure retarded injection and a state of the conventional SI combustion.

FIG. 5 is charts comparing, between the SI combustion by the high pressure retarded injection (solid line) and the conventional SI combustion in which the fuel injection is performed during the intake stroke (broken line), differences in a heat release rate (upper chart) and an extent of reaction of unburned air-fuel mixture (lower chart). The lateral axis in FIG. 5 indicates the crank angle. A condition of the comparison is that the operating state of the engine 1 is within the high engine load range of the low engine speed range, and a fuel amount to be injected is the same in both cases for the SI combustion by the high pressure retarded injection and the conventional SI combustion.

First, for the conventional SI combustion, a predetermined amount of fuel injection into the cylinder 18 is performed during the intake stroke (broken line in the upper chart). During the period after the fuel is injected into the cylinder 18 to when the piston 14 reaches the compression top dead center, the comparatively homogenized air-fuel mixture is formed inside the cylinder 18. Further, in this case, the ignition is performed at a predetermined timing indicated by the first white circle after the compression top dead center, and thereby, the combustion starts. As indicated by the broken line in the upper chart of FIG. 5, after the combustion starts, the combustion ends after progressing through a peak of the heat release rate. Here, a period between the start of the fuel injection to the end of the combustion corresponds to a reactable time of the unburned air-fuel mixture (hereinafter, it may simply be referred to as the reactable time) and, as indicated by the broken line in the lower chart of FIG. 5, the reaction of the unburned air-fuel mixture gradually progresses. The dotted line in the lower chart indicates an ignition threshold that represents a reactivity of the unburned air-fuel mixture to be ignited. The conventional SI combustion has an extremely long reactable time and the reaction of the unburned air-fuel mixture keeps progressing during the reactable time, therefore, the reactivity of the unburned air-fuel mixture exceeds the ignition threshold around the time of ignition and, thereby, causes the abnormal combustion such as the pre-ignition and knocking.

On the other hand, the high pressure retarded injection aims to, by shortening the reactable time, avoid the abnormal combustion. As shown in FIG. 5, the reactable time is a time length where a period in which the direct injector 67 injects fuel ((1) an injection period), a period from the end of the injection until a combustible air-fuel mixture is formed around the ignition plug 25 ((2) an air-fuel mixture forming period), and a period from the end of air-fuel mixture formation around the spark plug 25 until the combustion started by the ignition ends ((3) a combustion period) are added to each other, that is, (1)+(2)+(3). The high pressure retarded injection shortens the injection period, the air-fuel mixture forming period, and the combustion period, respectively, and thereby, shortens the reactable time. The shortenings of the periods are explained in sequence.

First, a high fuel pressure relatively increases the fuel injection amount to be injected from the direct injector 67 per unit time. Therefore, as shown in the chart in the second row of FIG. 6 labeled as "(1)", in a case where the fuel injection amount is set to be constant, a relation between the fuel pressure and the injection period of the fuel substantially becomes as follows: the injection period extends as the fuel pressure decreases, and the injection period contracts as the fuel pressure increases. Therefore, the high pressure retarded injection in which the fuel pressure is set significantly higher than the conventional pressure shortens the injection period.

Further, the high fuel pressure is advantageous in atomizing the atomized fuel injected into the cylinder 18 and extends a spreading distance of the atomized fuel to be longer. Therefore, as shown in the chart in the third row of FIG. 6 labeled as "(A)", a relation between the fuel pressure and the fuel vaporization time substantially becomes as follows: the fuel vaporization time extends as the fuel pressure decreases, and fuel vaporization time contracts as the fuel pressure increases. Further, as shown in the chart in the fourth row of FIG. 6 labeled as "(B)", a relation between the fuel pressure and a time length for atomized fuel to reach around the ignition plug 25 substantially becomes as follows: the time length for the atomized fuel to reach around the ignition plug 25 (the atomized fuel reaching time) extends as the fuel pressure decreases, and the reaching time of the atomized fuel contracts as the fuel pressure increases. Note that, the time length for the atomized fuel to reach around the ignition plug 25 can be calculated from an atomized fuel spreading distance between the tip of the direct injector 67 and the ignition plug 25 and a fuel injection speed in proportion to the fuel pressure. The air-fuel mixture forming period is a time length where a fuel vaporization time and the atomized fuel reaching time to around the ignition plug 25 are added to each other ((A)+(B)), therefore, as shown in the chart in the second row of FIG. 6 labeled as "(2)", the air-fuel mixture forming period contracts as the fuel pressure increases. Therefore, the high pressure retarded injection in which the fuel pressure is set significantly higher than the conventional pressure shortens the fuel vaporization time and the atomized fuel reaching time to around the ignition plug 25 and, as a result, shortens the air-fuel mixture forming period. On the other hand, as indicated by the white circle of the chart in FIG. 6 labeled as "(2)", with the conventional intake stroke injection with the low fuel pressure, the air-fuel mixture forming period significantly extends. Note that, as described above, the combination of the multi hole injector 67 and the cavity 141 shortens the time length from the end of fuel injection until when the atomized fuel to reach around the ignition plug 25 and, as a result, becomes advantageous in shortening the air-fuel mixture forming period.

As above, shortening the injection period and the air-fuel mixture forming period enables the injection timing of the fuel to be retarded, to be more precise, the injection start timing to be set comparatively late. Therefore, as shown in the upper chart of FIG. 5, with the high pressure retarded injection, the fuel injection is performed within the retard period from the late stage of the compression stroke to the early stage of the expansion stroke. Although, accompanying the injection of the fuel into the cylinder 18 with the high fuel pressure, turbulence of flow inside the cylinder becomes strong and a turbulence kinetic energy inside the cylinder 18 increases, the high turbulence kinetic energy is, together with the timing of the fuel injection being set to the comparatively late timing, advantageous in shortening the combustion period.

That is, as shown in the chart in the fourth row of FIG. 6 labeled as "(D)", in a case where the fuel injection is performed during the retard period, a relation between the fuel pressure and the turbulence kinetic energy during the combustion period substantially becomes as follows: the turbulence kinetic energy decreases as the fuel pressure decreases and the turbulence kinetic energy increases as the fuel pressure increases. Note that, the broken line in the chart of FIG. 6 labeled as "(D)" shows an example of a case where the fuel injection is performed during the intake stroke. Even if the fuel is injected into the cylinder 18 with the high fuel pressure, in the case where the injection timing is during the intake stroke, due to the time length until the ignition timing θ ig being long and inside the cylinder 18 being compressed on the compression stroke after the intake stroke, the turbulence inside the cylinder 18 subsides. As a result, in the case where the fuel injection is performed during the intake stroke, the turbulence kinetic energy within the combustion period becomes comparatively low regardless of the level of the fuel pressure.

As shown in the chart in the third row of FIG. 6 labeled as "(C)", a relation between the turbulence kinetic energy within the combustion period and the combustion period substantially becomes as follows: the combustion period extends as the turbulence kinetic energy decreases and the combustion period contracts as the turbulence kinetic energy increases. Therefore, based on the parts (C) and (D) in FIG. 6, a relation between the fuel pressure and the combustion period becomes as follows as shown in the chart in the second row of FIG. 6 labeled as "(3)", the combustion period extends as the fuel pressure decreases and the combustion period contracts as the fuel pressure increases. That is, the high pressure retarded injection shortens the combustion period. On the other hand, as indicated by the white circle in the chart in FIG. 6 labeled as "(3)", with the conventional intake stroke injection with the low fuel pressure, the combustion period extends. Note that, the multi hole injector 67 is advantageous in increasing the turbulence kinetic energy inside the cylinder 18 and shortening the combustion period, and further, with the combination of the multi hole injector 67 and the cavity 141, keeping the atomized fuel within the cavity 141 is also advantageous in shortening the combustion period.

Figure 6:
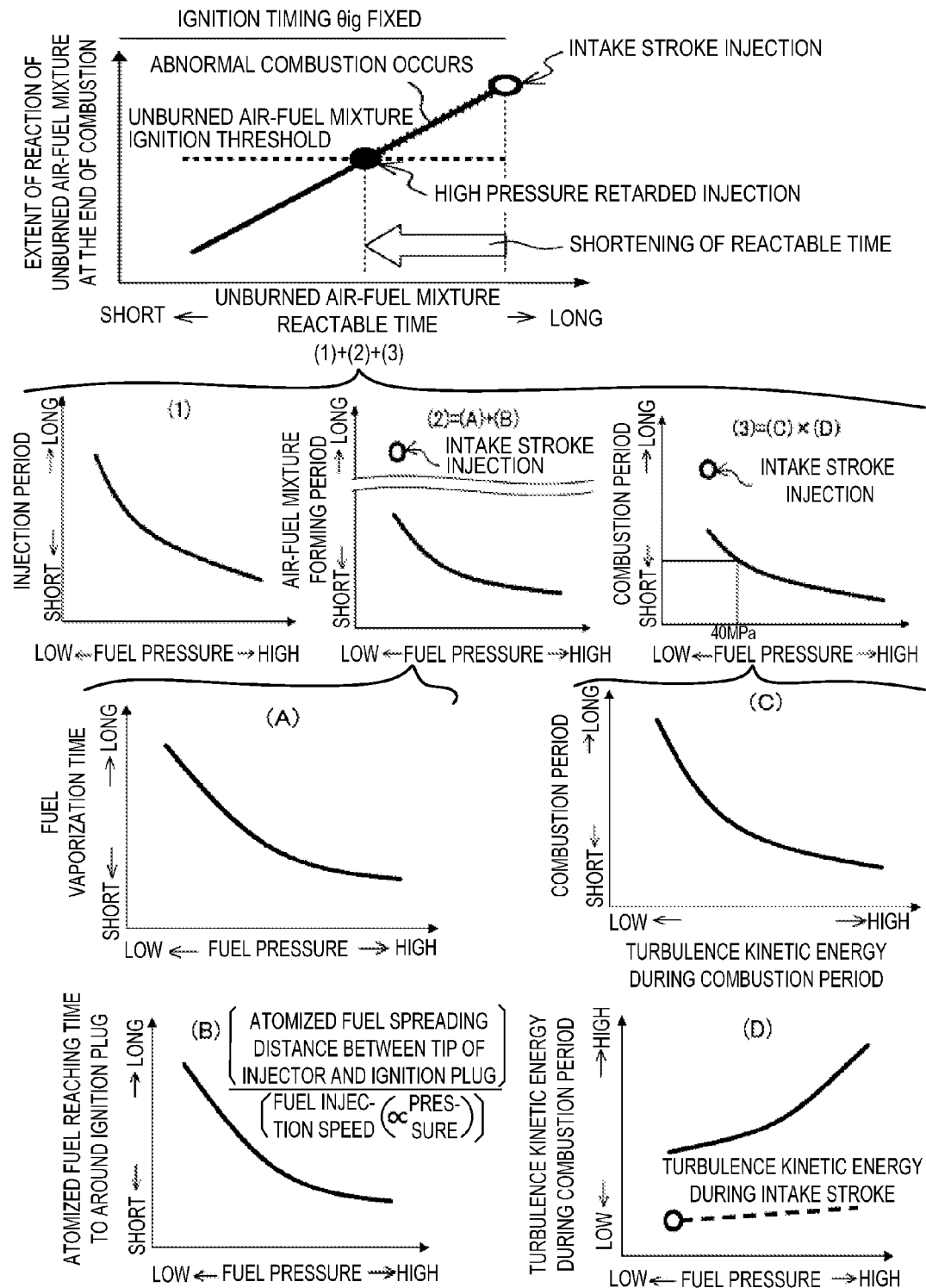
FIG. 6 is views showing, regarding a relation between an unburned air-fuel mixture reactable time and an extent of reaction of the unburned air-fuel mixture, a difference between the SI combustion by the high pressure retarded injection and the conventional SI combustion (the chart in the first row), and a relation of a fuel pressure with each of parameters relating to the unburned air-fuel mixture reactable time (each of the charts in the second to fourth rows).

Based on the relation between the fuel pressure and the combustion period shown in the chart of (3) in FIG. 6, in other words, based on the curve line shape in the chart, by setting the fuel pressure to, for example, 40 MPa or above, the combustion period can effectively be shortened. Further, the fuel pressure of 40 MPa or above can also effectively shorten the injection period and the air-fuel mixture forming period, respectively. Note that, the fuel pressure is preferably set according to the kind of the fuel used, which at least includes gasoline. The maximum value of the fuel pressure may be, for example, 120 MPa.

As above, the high pressure retarded injection shortens the injection period, the air-fuel mixture forming period, and the combustion period, respectively, and as a result, as shown in FIG. 5, can shorten the reactable time of the unburned air-fuel mixture from an injection start timing of fuel (SOI) to a combustion end timing θend to be significantly shorter than the conventional case where the fuel injection is performed during the intake stroke. As a result of shortening the reactable time, as shown in the chart in the first row, although with the conventional intake stroke injection with the low fuel pressure, as indicated by the white circle, the extent of reaction of the unburned air-fuel mixture at the end of combustion exceeds the ignition threshold and the abnormal combustion occurs, with the high pressure retarded injection, as indicated by the black circle, the progression of the reaction of the unburned air-fuel mixture at the end of the combustion is suppressed and the abnormal combustion can be avoided. Note that, the ignition timings θ ig for cases indicated by the white and black circles in the chart in the first row of FIG. 6 are set to be the same.

Figure 7:
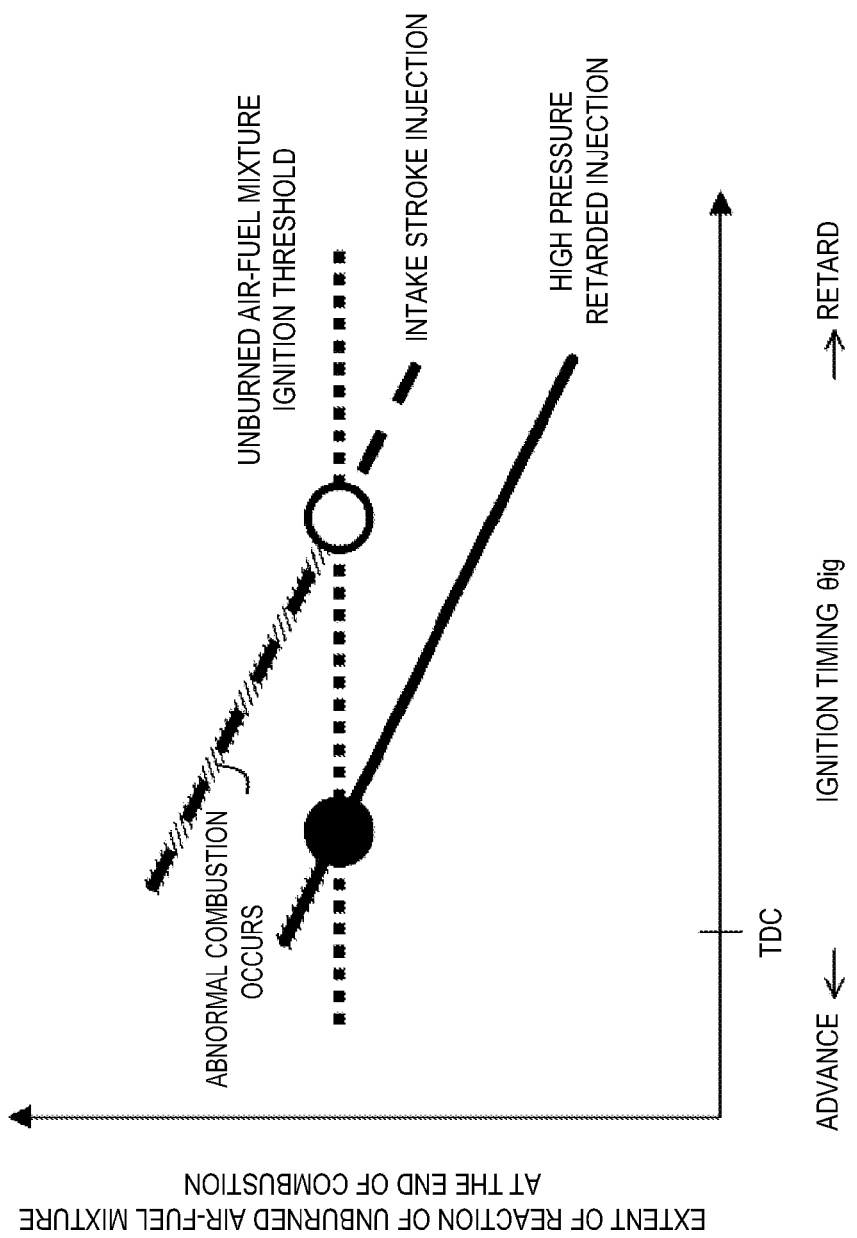
FIG. 7 is a chart showing, regarding a relation between an ignition timing and the extent of reaction of the unburned air-fuel mixture, a difference between the SI combustion by the high pressure retarded injection and the conventional SI combustion.

The high pressure retarded injection avoids the abnormal combustion by devising the mode of the fuel injection into the cylinder 18. Alternatively, conventionally, it has been known to retard the ignition timing θ ig for a purpose of avoiding the abnormal combustion. The retarded ignition timing θ ig suppresses the increases of the temperature and pressure of the unburned air-fuel mixture and, thereby, suppresses the progression of the reaction of the unburned air-fuel mixture. FIG. 7 shows a relation between the ignition timing θ ig and the extent of reaction of the unburned air-fuel mixture at the end of combustion. The broken line in FIG. 7 shows the case of the conventional SI combustion in which the intake stroke injection is performed, and the solid line shows the case of the SI combustion in which the high pressure retarded injection is performed. As described above, because the retarded ignition timing θ ig suppresses the progression of the reaction of the unburned air-fuel mixture, each of the solid and broken lines is a downward-sloping curve. Further, as described above, because the high pressure retarded injection suppresses the progression of the reaction of the unburned air-fuel mixture by the fuel injection, with the ignition timings θ ig being set to be the same for both cases, the reaction of the unburned air-fuel mixture progresses more with the conventional SI combustion in which the intake stroke injection is performed, compared to the case of the SI combustion in which the high pressure retarded injection is performed. That is, the broken line is located above the solid line. Therefore, in the case where the conventional intake stroke injection is performed (white circle), the ignition timing θ ig needs to be retarded compared to the case where the high retarded injection is performed (black circle) otherwise the progression of reaction of the unburned air-fuel mixture exceeds the ignition threshold. In other words, in the case of performing the high pressure retarded injection, the ignition timing θ ig can be advanced more than the case of performing the conventional intake stroke injection.

Figure 8:
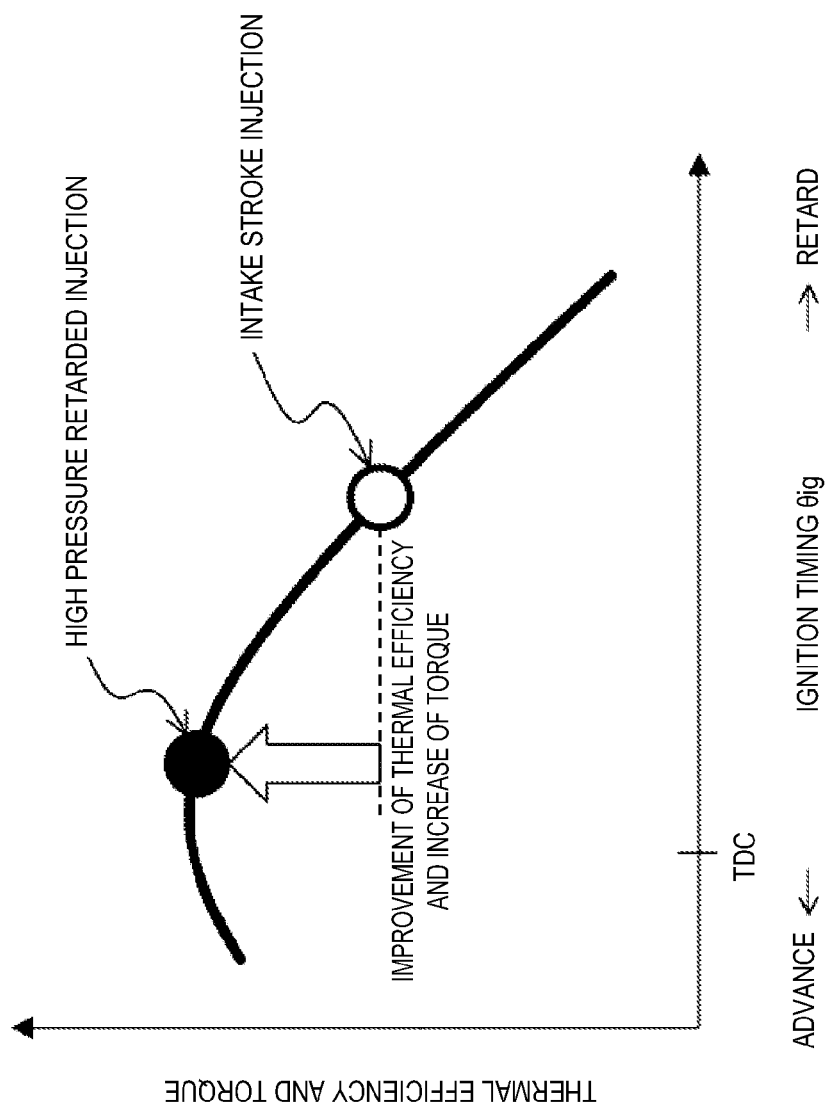
FIG. 8 is a chart showing, regarding a relation of the ignition timing with a thermal efficiency and a torque, a difference between the SI combustion by the high pressure retarded injection and the conventional SI combustion.

Further, FIG. 8 is a chart showing a relation of the ignition timing θ ig with a thermal efficiency and a torque. The ignition timing θ ig at which the thermal efficiency and the torque are at the maximum values, respectively, is near the compression top dead center, and the thermal efficiency and the torque decrease as the ignition timing θ ig is retarded. As described above, in the case of performing the injection during the intake stroke, as indicated by the white circle, the ignition timing θ ig needs to be retarded. On the other hand, in the case of performing the high pressure retarded injection, as indicated by the black circle, the ignition timing θ ig can be advanced, and thereby, the timing can approach the compression top dead center. Thus, the thermal efficiency improves and the torque increases. That is, the high pressure retarded injection not only avoids the abnormal combustion, but also enables the ignition timing θ ig to be advanced by the amount with which the abnormal combustion can be avoided, and thereby, is advantageous in improving the fuel consumption.

Figure 9:
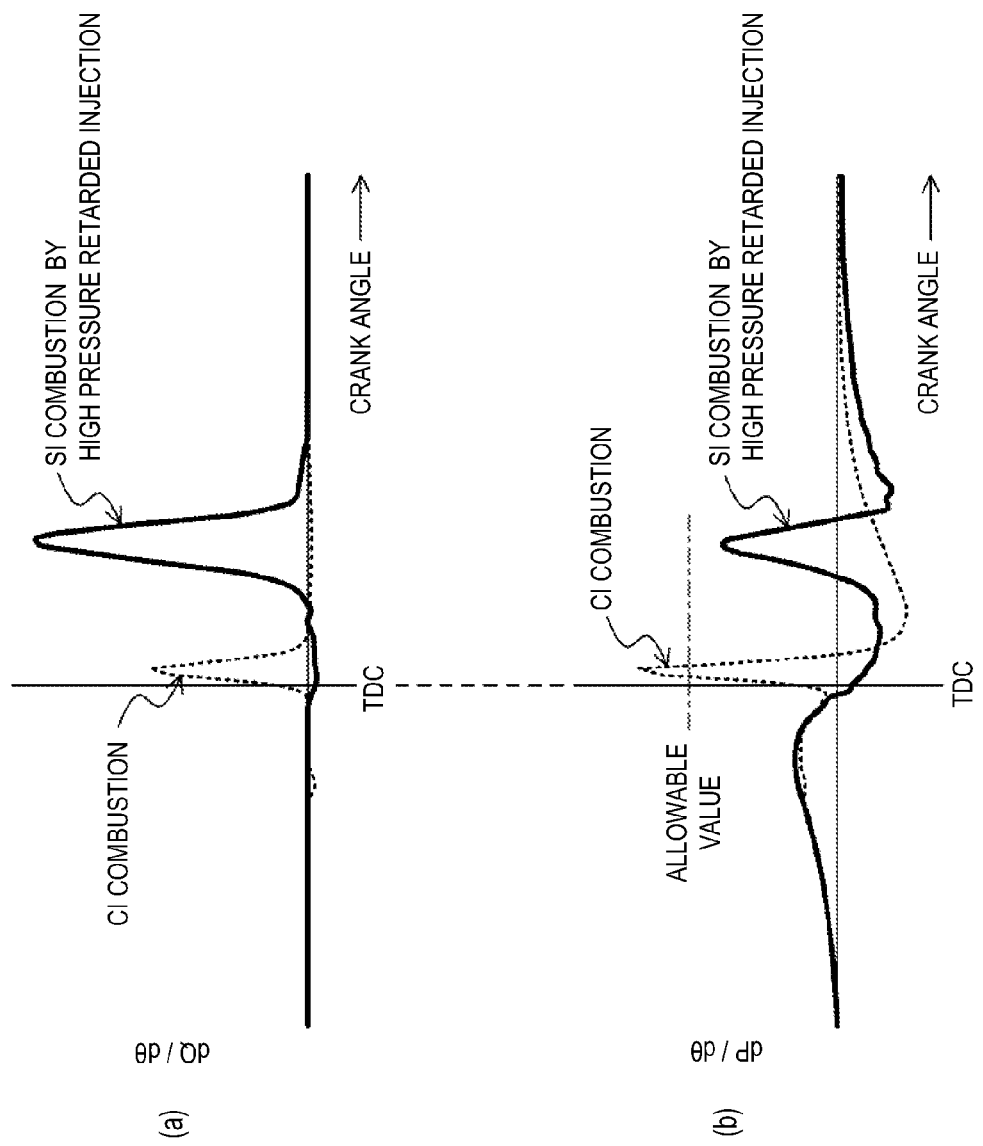
FIG. 9 is charts showing a difference of (a) a heat release rate (dQ/dθ), and (b) a cylinder internal pressure increase rate (dP/dθ), between the SI combustion by the high pressure retarded injection and a CI combustion.

Here, the characteristic of the SI combustion using the high pressure retarded injection is briefly described with reference to FIG. 9. In FIG. 9, the part (a) is a chart showing a change of the heat release rate (dQ/dθ) according to the crank angle, and the part (b) is a chart showing a change of a cylinder internal pressure increase rate (dP/dθ) according to the crank angle. The solid lines in the parts (a) and (b) indicate the case where the SI combustion using the high pressure retarded injection is performed, and the broken lines in the parts (a) and (b) indicate the case where the compression-ignition combustion (CI combustion) is performed. Note that, the operating state of the engine 1 is within the high engine load range of the low engine speed range. First, with the CI combustion, as shown in the part (a) of FIG. 9, the speed of the combustion becomes rapid and the combustion period becomes extremely short. Further, as shown in the part (b) of FIG. 9, a peak of the cylinder internal pressure becomes too high and exceeds the allowable value and the problem of the combustion noise arises. That is, the above results indicate that when the operating state of the engine 1 is within the high engine load range of the low engine speed range, the CI combustion cannot be performed.

On the other hand, with the SI combustion using the high pressure retarded injection, as shown in the part (a) of FIG. 9, a high heat release rate and an appropriate combustion period are secured and a sufficient torque is obtained, and further, as shown in the part (b) of FIG. 9, the peak of the cylinder internal pressure becomes lower than the allowable value and the generation of the combustion noise can be avoided. That is, when the operating state of the engine 1 is within the high engine load range of the low engine speed range, the SI combustion using the high pressure retarded injection is extremely advantageous.

Next, operation states of the intake and exhaust valves 21 and 22 and examples of controlling the fuel injection timing and the ignition timing θ ig according to the operating state of the engine 1 are described with reference to FIG. 10. Here, in cases shown in the parts (a), (b), (c) and (d) of FIG. 10, the operating state of the engine 1 is basically within the low engine speed range and the engine load becomes higher in the order of (a)<(b)<(c)<(d). In the cases of the parts (a) and (b), the operating state is within the low engine load range corresponding to the CI mode and, in the case of the part (c), the operating state is within the high engine load range corresponding to the SI mode. In the case of the part (d), the operating state is within the full engine load range corresponding to the SI mode. Note that, the case of the part (d) also corresponds to the case where the operating state of the engine 1 is within a middle engine speed range of the high engine load range.

Figure 10:
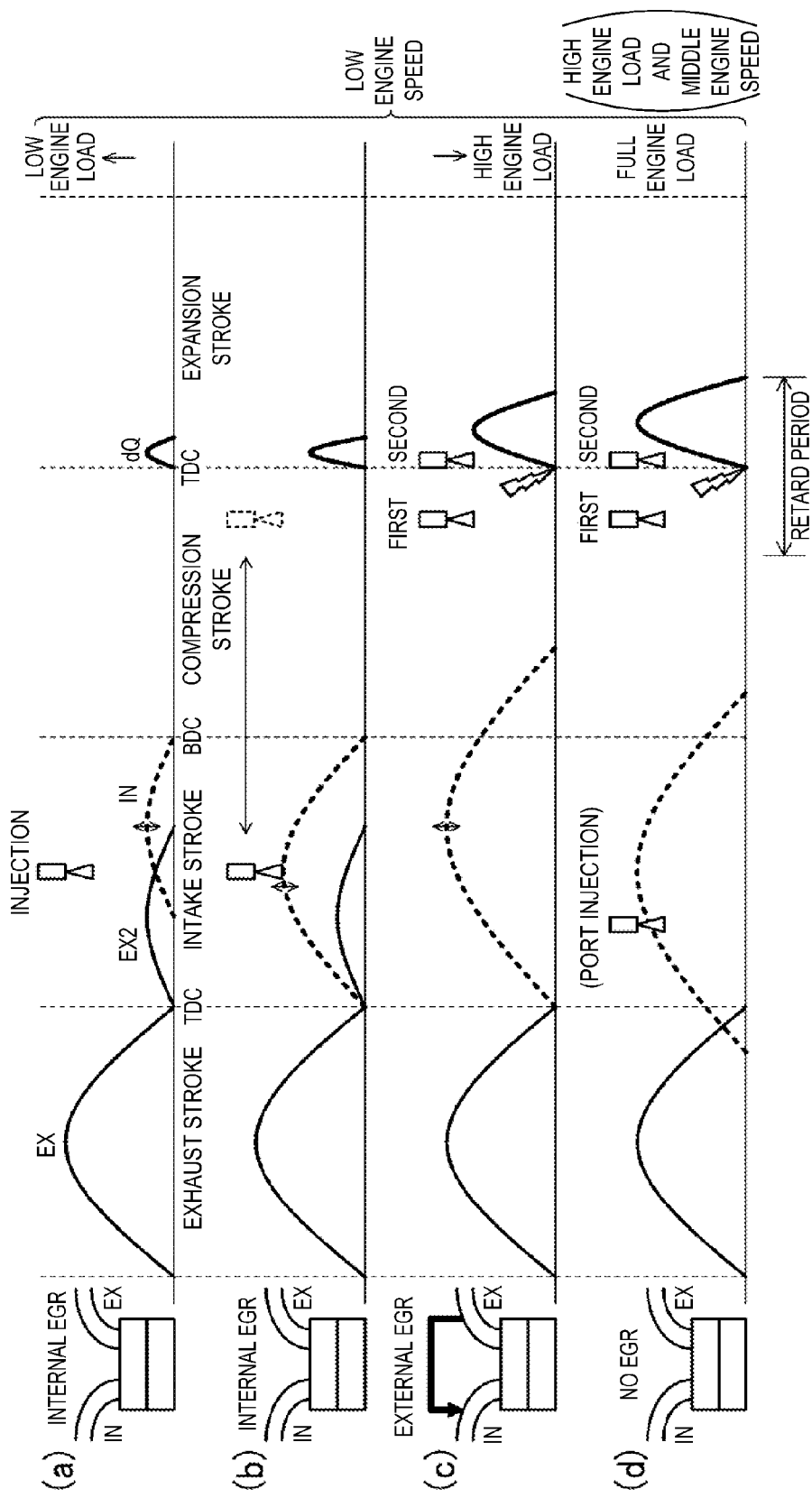
FIG. 10 is timing charts showing a difference in operations of an intake valve and an exhaust valve, and a difference in the ignition timing and an injection timing, according to a change of an engine load.

First, the part (a) in FIG. 10 indicates when the operating state of the engine 1 is within the low engine load range of the low engine speed range. Because the combustion mode in this range is CI mode, the exhaust valve is opened twice, in which the exhaust valve 22 is opened during the intake stroke, by controlling the VVL 71 (see the solid line labeled as "EX2" in the part (a) of FIG. 10, note that, the solid line indicates a lift curve of the exhaust valve 22 and the broken line indicates a lift curve of the intake valve 21), and thereby, the internal EGR gas is introduced into the cylinder 18. The introduction of the internal EGR gas increases the temperature at the end of the compression stroke and stabilizes the compression-ignition combustion. The timing of the fuel injection is set to be during the intake stroke, and the direct injector 67 injects the fuel into the cylinder 18, thereby, the homogenous lean air-fuel mixture is formed inside the cylinder 18. Note that, the fuel injection amount is set according to the load of the engine 1.

The part (b) in FIG. 10 also shows the case where the operating state of the engine 1 is within the low engine load range of the low engine speed range. However, the engine load in the case of the part (b) in FIG. 10 is higher than the case of the part (a) in FIG. 10. Because the combustion mode within this operating range is also the CI mode, similar to the above, the exhaust valve is opened twice during one cycle of the engine by controlling the VVL 71 and the internal EGR gas is introduced into the cylinder 18. Note that, the temperature inside the cylinder 18 naturally increases as the engine load increases, therefore, in view of avoiding a pre-ignition, an internal EGR amount is reduced. As illustratively shown in the parts (a) and (b) of FIG. 10, the lift of the intake valve 21 may be adjusted by controlling the CVVL 73, so as to adjust the internal EGR amount. Note that, although it is not illustrated in the drawings, the internal EGR amount may be controlled by adjusting the opening of the throttle valve 36. Further, the timing of the fuel injection is set to a suitable timing during the intake stroke or the compression stroke. The direct injector 67 injects the fuel into the cylinder 18 at the set timing and, thereby, forms the homogenized or stratified lean air-fuel mixture. Similar to the case of the part (a) in FIG. 10, the fuel injection amount is set according to the load of the engine 1.

Note that, the parts (a) and (b) in FIG. 10 show examples in which the opening period of the exhaust valve 22 during the intake stroke is set to be in the early-half stage thereof. The opening period of the exhaust valve 22 may be set to be in the late-half stage of the intake stroke. Further, if the opening period of the exhaust valve 22 is set to be in the early-half stage of the intake stroke, the exhaust valve 22 may be kept open from during the exhaust stroke, which includes the exhaust top dead center, to the early-half stage of the intake stroke.

The part (c) in FIG. 10 shows a case where the operating state of the engine 1 is within the high engine load range of the low engine speed range. The combustion mode within this operating range is the SI mode, and the exhaust valve 22 is not opened twice during one cycle of the engine within the operating range. Further, in the SI mode, a charging amount of air-fuel mixture is adjusted to satisfy the air-fuel ratio of λ=1. The adjustment of the charging amount may be performed by a retarded closure of the intake valve 21, where the closing timing of the intake valve 21 is set to be after an intake bottom dead center by controlling the VVT 72 and the CVVL 73, while the throttle valve 36 is fully opened. This is beneficial in reducing a pumping loss. The adjustment of the charging amount may be performed by controlling the opening of the EGR valve 511 so as to adjust the amounts of new air and external EGR gas to be introduced into the cylinder 18, while the throttle valve 36 is fully opened. This is beneficial in reducing the pumping loss as well as reducing a cooling loss. The introduction of the external EGR gas contributes in avoiding the abnormal combustion and is advantageous in suppressing a generation of Raw NOx. Alternatively, the retarded closure control of the intake valve 21 and the control of the external EGR may be combined to adjust the charging amount. Especially, when the engine load is relatively low within the high load range, the charging amount may be adjusted through the retarded closure control of the intake valve 21 while introducing the external EGR gas into the cylinder 18 so as to suppress the excessive increase of the EGR ratio.

Further, the mode of the fuel injection in this case is the high pressure retarded injection. Therefore, the direct injector 67 directly injects the fuel into the cylinder 18 by high fuel pressure within the retard period from the late stage of the compression stroke to the early stage of the expansion stroke. In the high pressure retarded injection, the injection may be once (i.e., the lump-sum injection) and, alternatively, as shown in the part (c) of FIG. 10, two injections; a first injection and a following second injection may be performed within the retard period (i.e., the divided injections). The first injection can secure a relatively long air-fuel mixture forming period and, therefore, is beneficial in vaporizing and atomizing the fuel. The timing of the second injection can be set to a further retarded timing corresponding to the sufficient air-fuel mixture forming period secured by the first injection. This is beneficial in increasing the turbulence kinetic energy inside the cylinder as well as in shortening the combustion period. In the case of performing the divided injections, the fuel injection amount in the second injection is preferably set larger than the fuel injection amount in the first injection. Thereby, the turbulence kinetic energy is sufficiently increased, which is beneficial in shortening the combustion period and, as a result, avoiding the abnormal combustion. Note that, the divided injections may be only performed when the engine load is relatively high within the high engine load range, where the fuel injection amount increases, and when the engine load is relatively low within the high engine load range, where the fuel injection amount is comparatively small, the lump-sum injection may be performed. Further, the divided injections are not limited to twice and may be three times or above.

Thereby, in the SI mode, the ignition by the ignition plug 25 is executed near the compression top dead center after the fuel injection.

The part (d) in FIG. 10 shows a case where the operating state of the engine 1 is within the full engine load range of the low engine speed range. Similar to the part (c) in FIG. 10, the combustion mode within this operating range is also the SI mode, and the exhaust valve 22 is not opened twice during one cycle of the engine. Further, due to the operating state being within the full engine load range, the external EGR is stopped by closing the EGR valve 551.

The mode of the fuel injection in this case is basically the high pressure retarded injection, and, as shown in the part (d) of FIG. 10, the two injections of the first and second injections into the cylinder 18 are performed within the retard period. Note that, the high pressure retarded injection may be the lump-sum injection. Further, within the full engine load range, the injections during the intake stroke may be added so as to improve an intake air charging efficiency. The intake stroke injection improves the intake air charging efficiency due to the cooling effect of the intake air caused by the fuel injection and is advantageous in increasing the torque. Therefore, when the operating state of the engine 1 is within the full engine load range of the low engine speed range, the fuel injection is performed three times: the intake stroke injection, and the first injection and second injections, or the fuel injection is performed twice: the intake stroke injection and the lump-sum injection.

Here, as described above, the high pressure retarded injection in which the fuel is directly injected into the cylinder 18 by the direct injector 67 has an extremely high fuel pressure. Therefore, if the fuel is directly injected into the cylinder 18 with such a high fuel pressure during the intake stroke, there is a possibility that a large amount of fuel adheres on a wall surface of the cylinder 18 and, thereby, causes a problem such as oil dilution. Thus, in the intake stroke injection, the fuel is injected into the intake port 16 through the port injector 68 for injecting the fuel with the relatively low fuel pressure, without using the direct injector 67. Thereby, the above described problem such as the oil dilution is avoided.

Further, as described above, the case shown in the part (d) of FIG. 10 also corresponds to a case where the operating range of the engine 1 is within the middle engine speed range of the high engine load range. When the operating state of the engine 1 within the middle engine speed range, the flow inside the cylinder 18 becomes stronger compared to within the low engine speed range and an actual time length required for the change of the crank angle, thus, it becomes advantageous in avoiding the abnormal combustion. Therefore, even if the fuel amount of the high pressure retarded injection that is performed during the retard period, from the late stage of the compression stroke to the early stage of the expansion stroke, is reduced, the abnormal combustion may be avoided. Thus, when the operating state of the engine 1 is within the middle engine speed range of the high engine load range, the fuel injection amount of the high pressure retarded injection is reduced and the fuel amount corresponding to the reduced amount is added to the intake stroke injection for injecting during the intake stroke. Thereby, similar to the above, as a result of improving the intake air charging efficiency, this case becomes advantageous in increasing the torque. Therefore, when the operating state of the engine 1 is within the middle engine speed range of the high engine load range, both avoiding the abnormal combustion and the improvement in torque are achieved. Note that, when cases of the operating state of the engine 1 being within the high engine load range (specifically, the full engine load range) of the low engine speed range and being within the middle engine speed range of the high engine load range are compared to each other, in other words, when, within the high engine load range, the low engine speed range and the middle range are compared to each other, there are cases where the fuel injection amount of the intake stroke injection may increase more within the middle engine speed range than within the low engine speed range.

FIGS. 11 to 14 show the control examples of the respective parameters of the engine 1 according to the variation in engine load within the low engine speed range, that are: (b) the opening of the throttle valve 36, (c) the opening of the EGR valve 511, (d) the closing timings in the case where the exhaust valve 22 is opened twice, (e) the opening timing of the intake valve 21, (f) closing timing of the intake valve 21, and (g) the lift of the intake valve.

Figure 11:
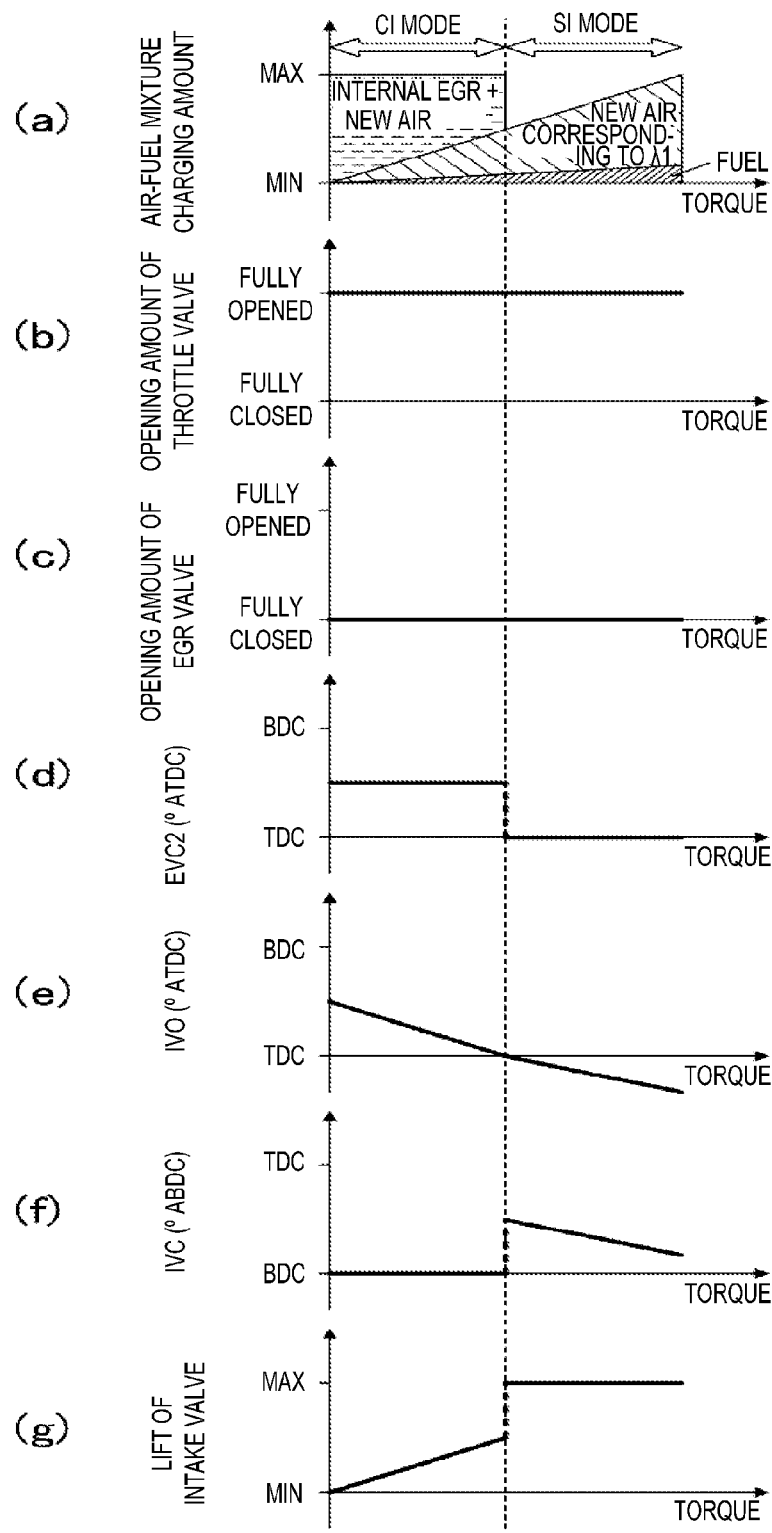
FIG. 11 is charts showing an example of changes of (a) an air-fuel mixture charging amount, (b) a throttle valve opening, (c) an EGR valve opening, (d) a closing timing in a case where the exhaust valve is opened twice, (e) an opening timing of the intake valve, (f) a closing timing of the intake valve, and (g) a lift of the intake valve, in a case where a control of an internal EGR amount is performed by a control of the intake valve within a low engine load range, and a control of throttling the intake is performed within a high engine load range.

The part (a) in FIG. 11 shows a state inside the cylinder 18. By having the lateral axis as the torque (in other words, the engine load) and the vertical axis as the air-fuel mixture charging amount, the part (a) in FIG. 11 shows a configuration of the air-fuel mixture inside the cylinder. As described above, the combustion mode within the left half side range of the chart, where the engine load is relatively low, is the CI mode, and the right half side range of the chart, where the engine load is higher than a predetermined engine load, is the SI mode. The fuel amount (total fuel amount) is increased corresponding to the increase of the engine load regardless of the combustion mode being the CI or SI mode. Therefore, with respect to the fuel amount, the amount of new air is set to satisfy the theoretical air-fuel ratio ($\lambda=1$), and the amount of new air is increased corresponding to the increase of the engine load, as the fuel amount increases.

In the CI mode, as described above, due to the internal EGR gas being introduced into the cylinder 18, the rest of the charging amount of the air-fuel mixture is formed by the internal EGR gas and the excess new air. Therefore, in the CI mode, the air-fuel mixture becomes lean.

Whereas, in the SI mode, the engine 1 is operated to satisfy $\lambda=1$ and the introduction of the internal EGR gas is stopped. As one of the control examples, in FIG. 11, the charging amount of the air-fuel mixture into the cylinder 18 under the SI mode is reduced and, especially in FIG. 11, in the SI mode, the charging amount is controlled by adjusting the closing timing of the intake valve 21.

As shown in the parts (b) and (c) of FIG. 11, the throttle valve 36 is set to be fully opened and the EGR valve 511 is set to be fully closed regardless of the level of the load of the engine 1, respectively, so that the state inside the cylinder 18 becomes the state shown in the part (a) of FIG. 11. Each of the control becomes advantageous in reducing the pumping loss.

The part (d) in FIG. 11 shows the closing timings of the exhaust valve 22 in the case where it is opened twice. In the CI mode, as described above, the closing timings are set to predetermined timings between the exhaust top dead center and the intake bottom dead center so as to introduce the internal EGR gas into the cylinder 18. Meanwhile, in the SI mode, the closing timing is set to the exhaust top dead center. That is, in the SI mode, as a result of stopping the opening of the exhaust valve twice, the control of the internal EGR is stopped.

As above, in the case of opening the exhaust valve 22 twice, the closing timing is set to the predetermined closing timing in the CI mode. Whereas, as shown in the part (e) of FIG. 11, the opening timing of the intake valve 21 is advanced as the load of the engine 1 increases, so as to approach the exhaust top dead center. Therefore, the internal EGR gas to be introduced into the cylinder 18 increases as the load of the engine 1 decreases and the internal EGR gas to be introduced into the cylinder 18 decreases as the load of the engine 1 increases. The temperature inside the cylinder 18 at the end of the compression stroke increases as the load of the engine 1 decreases because of the larger amount of internal EGR gas, therefore the case of (e) is advantageous in achieving the stable compression-ignition combustion. Further, the increase of temperature inside the cylinder 18 at the end of the compression stroke is suppressed as the load of the engine 1 increases because the internal EGR gas is suppressed, therefore the case of (e) is advantageous in suppressing the preignition. Note that in the SI mode, the opening timing of the intake valve 21 is further advanced from the exhaust top dead center, and the advanced amount increases corresponding to the increase of the engine load.

Meanwhile, as shown in the part (f) of FIG. 11, the closing timing of the intake valve 21 is set constant at the intake bottom dead center in the CI mode. On the other hand, in the SI mode, the closing timing of the intake valve 21 is retarded further from the intake bottom dead center. The retarded amount is set to gradually decrease corresponding to the increase of the engine load so that the retarded amount is large when the load of the engine 1 is relatively low, and is small when the load of the engine 1 is relatively high. Thereby, in the SI mode, the charging amount of the air-fuel mixture is reduced by the retarded closure control of the intake valve 21. Note that, alternative to the retarded closure control of the intake valve 21, the charging amount of the air-fuel mixture may be reduced by performing the opening adjustment of the throttle valve 36 in the SI mode.

Further, as shown in the part (g) of FIG. 11, in the CI mode, the lift of the intake valve 21 gradually increases starting from the minimum lift corresponding to the increase of the engine load, whereas, in the SI mode, the lift is set constant at the maximum lift regardless of the level of the engine load.

Figure 12:
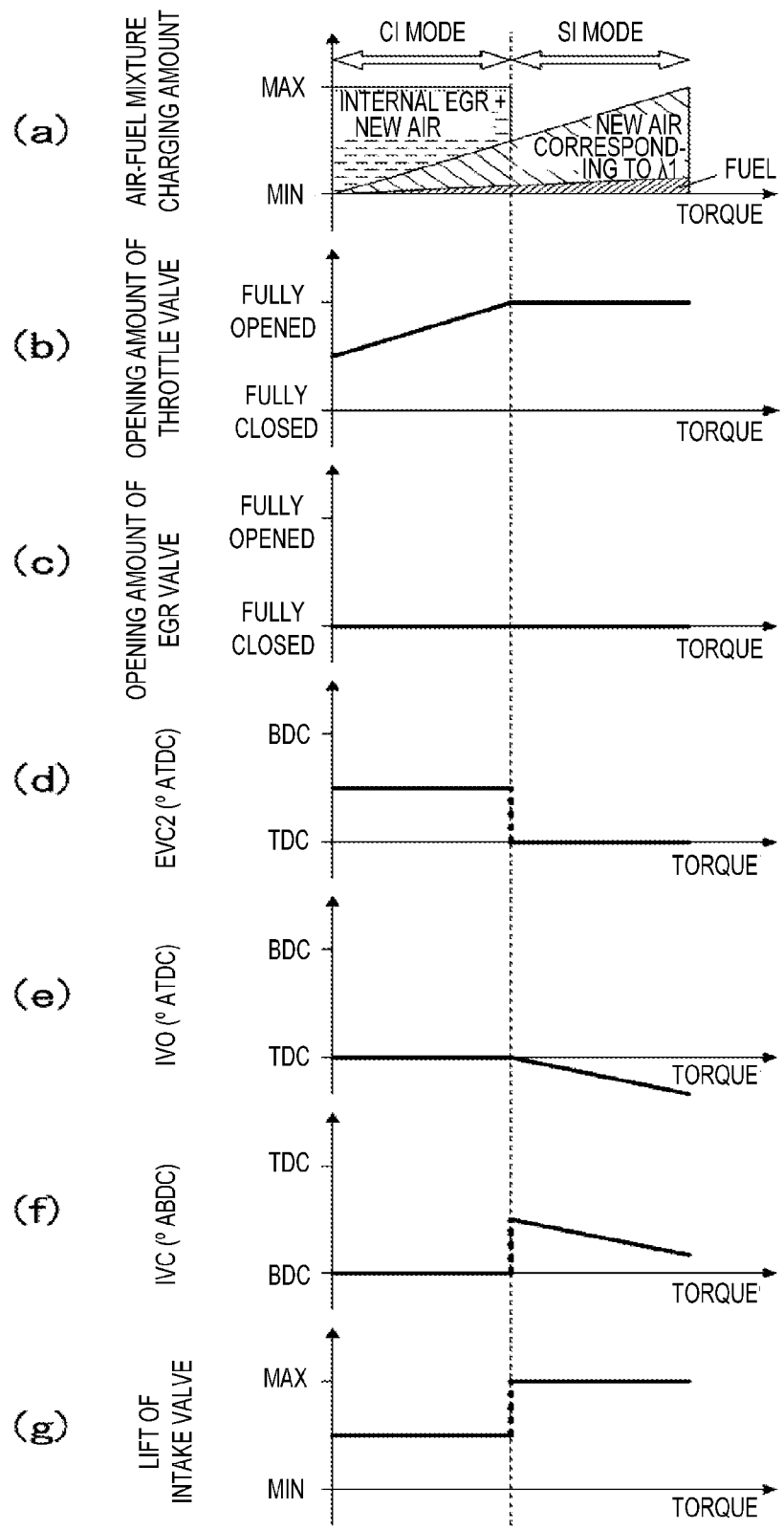
FIG. 12 is charts corresponding to FIG. 11 in a case where the control of the internal EGR amount is performed by a control of the throttle valve within the low engine load range, and the control of throttling the intake is performed within the high engine load range.

FIG. 12 shows another control example different from in FIG. 11. In FIGS. 11 and 12, the controls of (b) the opening of the throttle valve 36, (e) the opening timing of the intake valve 21, and (g) the lift of the intake valve 21 in the CI mode are different from each other. That is, firstly in the control shown in FIG. 12, as shown in the part (b), the throttle valve 36 is throttled in the CI mode, and the opening of the throttle valve 36 is controlled to gradually increase corresponding to the increase of the engine load so as to be small when the engine load is low in the CI mode, and large when the engine load is high in the CI mode. Meanwhile, the throttle valve 36 is fully opened in the SI mode.

Further, as shown in the part (e) of FIG. 12, the opening timing of the intake valve 21 is set constant at the exhaust top dead center in the CI mode regardless of the level of the engine load, and, as shown in the part (g) of FIG. 12, the lift of the intake valve 21 is set constant at a predetermined lift in the CI mode regardless of the level of the engine load. By such a combination of the controls of the throttle valve 36 and the intake valve 21, in the CI mode, the internal EGR gas amount to be introduced into the cylinder 18 is adjusted according to the opening of the throttle valve 36. Therefore, as it is clear from comparing the parts (a) in FIGS. 11 and 12 with each other, the configuration of the air-fuel mixture to be charged into the cylinder 18 in the control example shown in FIG. 12 is similar to that of the control example shown in FIG. 11.

Figure 13:
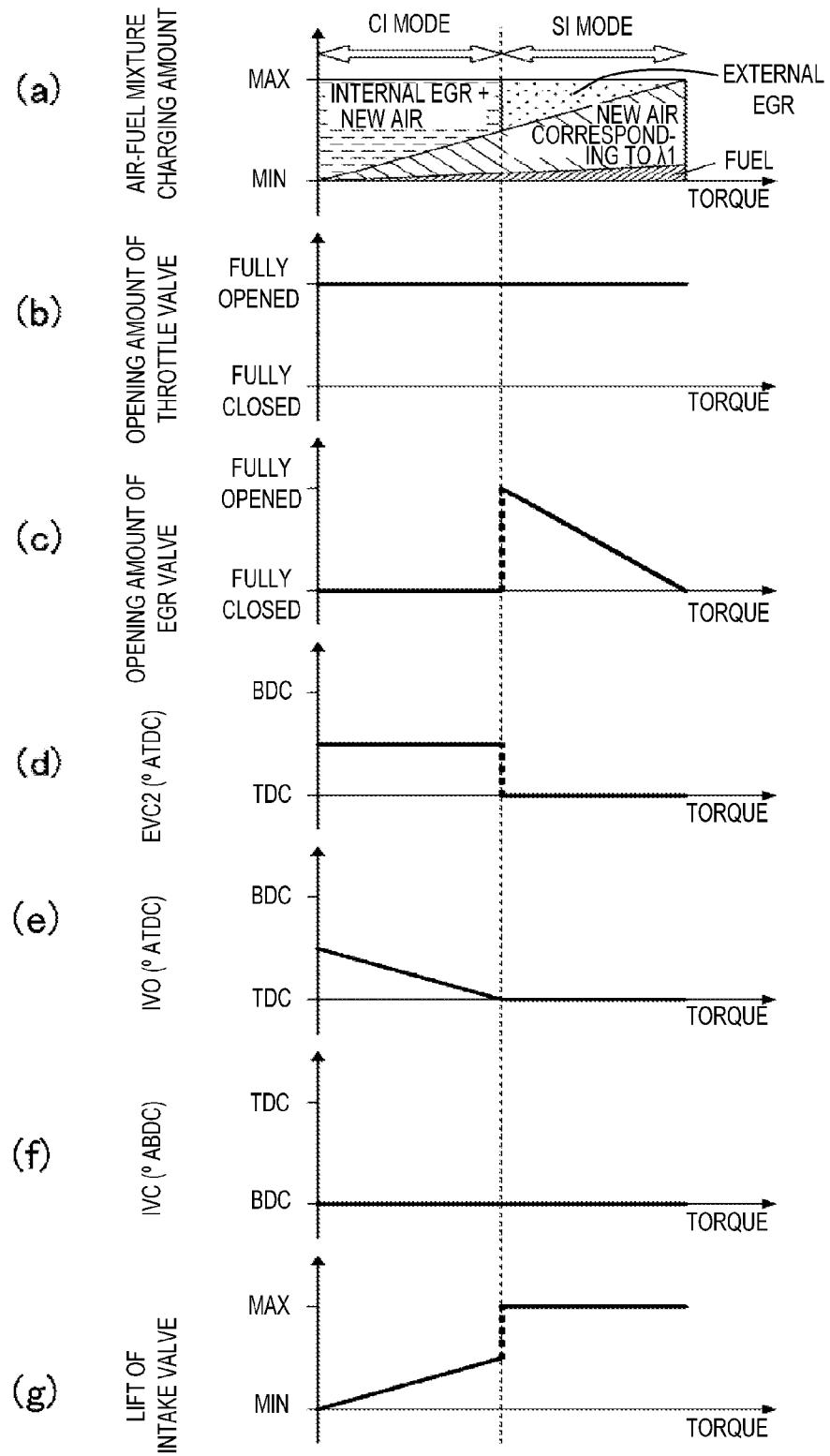
FIG. 13 is charts corresponding to FIG. 11 in a case where the control of the internal EGR amount is performed by a control of the throttle valve within the low engine load range, and an external EGR is utilized within the high engine load range.

FIG. 13 shows another control example different from FIG. 11 (and FIG. 12). In FIGS. 11 and 13, the controls of (c) the opening of the EGR valve 511, (e) the opening timing of the intake valve 21, and (f) the closing timing of the intake valve 21 in the SI mode are different from each other. That is, in FIG. 11 (and FIG. 12), as shown in the part (a), the charging amount of the air-fuel mixture into the cylinder 18 is reduced by adjusting the closing timing of the intake valve 21 in the SI mode, whereas, in the control example of FIG. 13, as shown in the part (a), the external EGR gas is introduced into the cylinder 18 in the SI mode.

First, as shown in the part (c) of FIG. 13, the EGR valve 511 remains closed in the CI mode, and is opened in the SI mode. The opening of the EGR valve 511 is decreased corresponding to the increase of the engine load so as to be larger as the engine load in the SI mode become lower, and smaller as the engine load in the SI mode becomes higher. More specifically, the EGR valve 511 is fully opened when switching between the CI and SI modes and fully closed when the engine load is full. Therefore, in this control example, the external EGR gas is not introduced into the cylinder 18 when the engine load is full, even in the SI mode.

Further, as shown in the part (e) of FIG. 13, the opening timing of the intake valve 21 is set constant at the exhaust top dead center in the SI mode, and, as shown in the part (f) of FIG. 13, the closing timing of the intake valve 21 is set constant at the intake bottom dead center in the SI mode. Therefore, in the SI mode, the throttle valve 36 is set constant in a fully opened state (the part (b) in FIG. 13), the opening and closing timings of the intake valve 21 are set constant, and the lift of the intake valve 21 is set constant at the maximum (the part (g) in FIG. 13). Accordingly, the ratio of the amount of new air and the external EGR gas amount to be introduced into the cylinder 18 is adjusted by adjusting the opening of the EGR valve 511. Such a control is advantageous in reducing the pumping loss. Further, in the SI mode, introducing the external EGR gas into the cylinder 18 is advantageous in reducing the cooling loss, avoiding the abnormal combustion, and suppressing Raw NOx.

Figure 14:
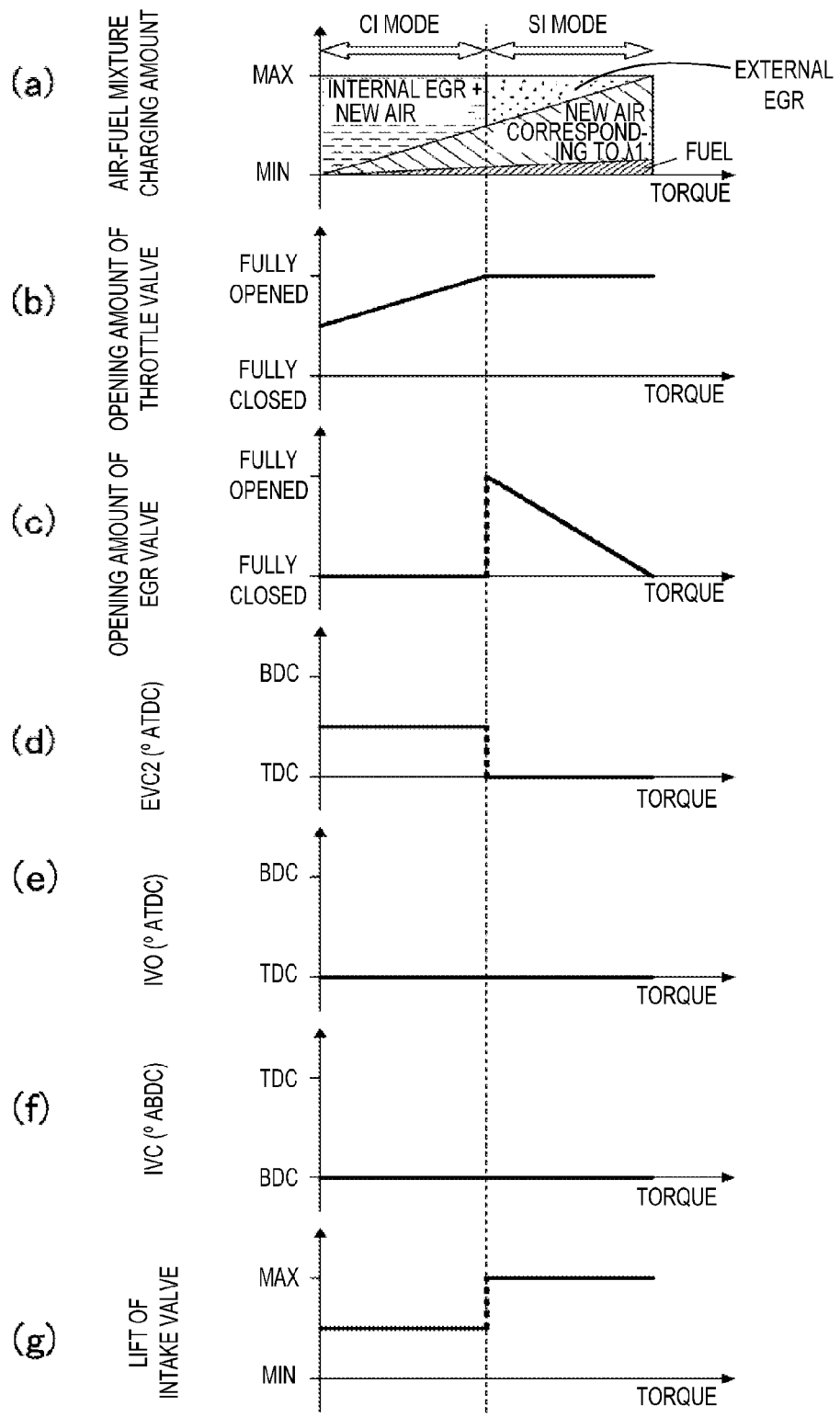
FIG. 14 is charts corresponding to FIG. 11 in a case where the control of the internal EGR amount is performed by the control of the throttle valve within the low engine load range, and the external EGR is utilized within the high engine load range.

The control example shown in FIG. 14 is the example of adopting the control example shown in FIG. 12 for the CI mode and the control example shown in FIG. 13 for the SI mode, and combining the two control examples.

Figure 15:
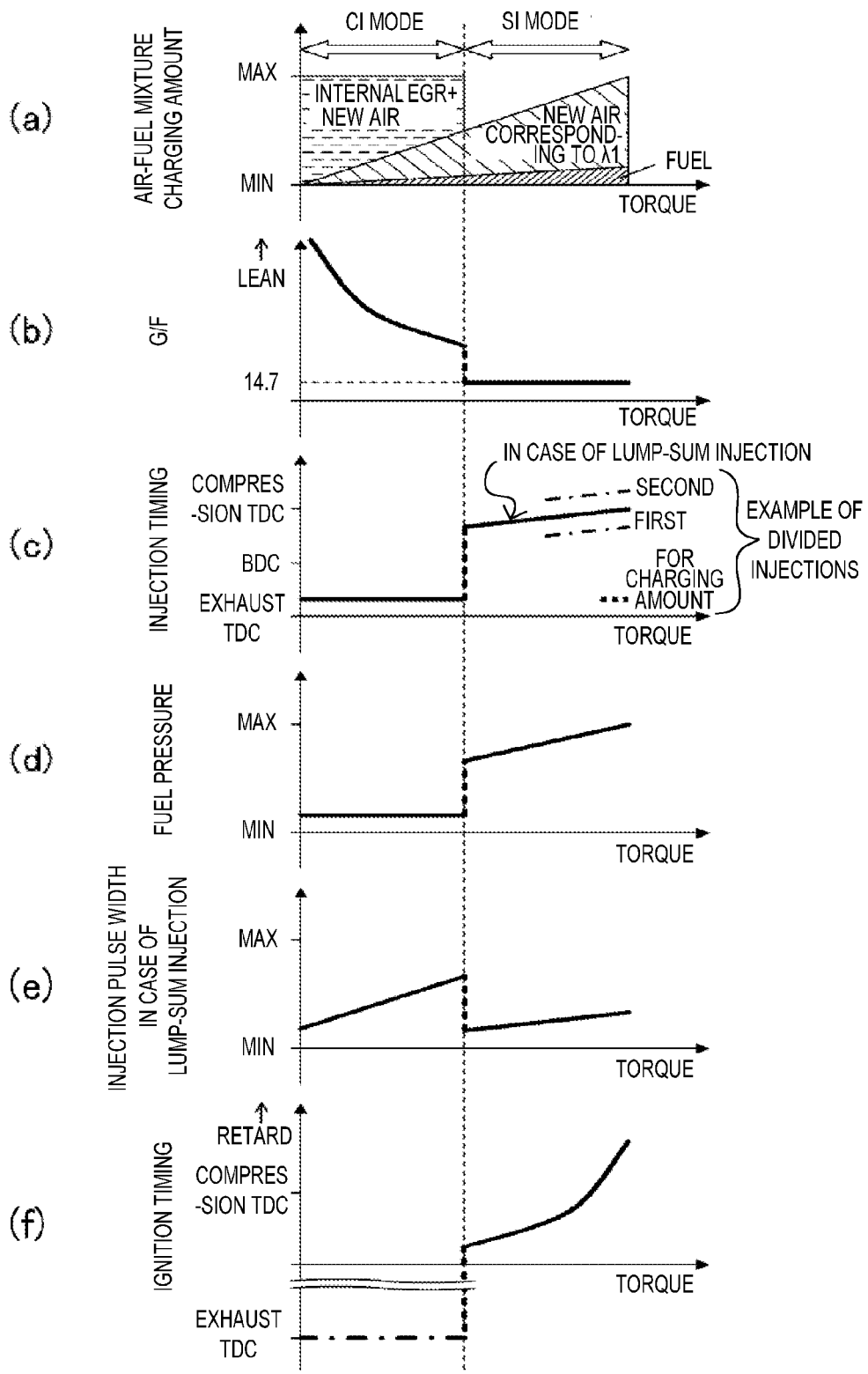
FIG. 15 is charts showing an example of changes of (a) the air-fuel mixture charging amount, (b) a G/F, (c) the injection timing, (d) the fuel pressure, (e) an injection pulse width, and (f) the ignition timing, in a case where the control of the internal EGR amount is performed within the low engine load range and the control of throttling the intake is performed within a high engine load range.

Next, FIG. 15 shows changes of the respective control parameters of the engine 1 according to the variation in load within the low engine speed range, that are: (b) G/F, (c) the injection timing, (d) the fuel pressure, (e) a fuel injection pulse width (i.e., injection period), and (f) the ignition timing θ ig.

First, in the case following the either one of the control examples shown in FIGS. 11 and 12, the state of the air-fuel mixture inside the cylinder becomes a state as shown in the part (a) of FIG. 15. Therefore, as shown in the part (b) of FIG. 15, in the CI mode, the G/F changes from lean to, by gradually approaching, the theoretical air-fuel ratio according to the increase of the fuel amount and, in the SI mode, because the charging amount of the air-fuel mixture is decreased as described above, the G/F is constant at the theoretical air-fuel ratio (G/F=14.7).

As shown in the part (c) of FIG. 15, in the CI mode, the fuel injection timing is set to be, for example, during the intake stroke between the exhaust top dead center and the intake bottom dead center. The fuel injection timing may be changed according to the load of the engine 1. On the other hand, in the SI mode, the fuel injection timing is set to be within the retard period from the late-half stage of the compression stroke to the early stage of the expansion stroke. That is, the high pressure retarded injection. Further, in the SI mode, the injection timing is gradually changed to the retarding side corresponding to the increase of the engine load. This is because the pressure and temperature inside the cylinder 18 increases corresponding to the increase of the engine load, and thereby, the abnormal combustion easily occurs, thus, the injection timing needs to be set to the retarding side so as to effectively avoid the abnormal combustion. Here, the solid line in the part (c) of FIG. 15 shows an example of the fuel injection timing in the case of performing the lump-sum injection in which the high pressure retarded injection is performed by a single fuel injection. On the other hand, the one-dot chain line in the part (c) of FIG. 15 shows an example of the fuel injection timings of the first and second injections in the case where the high pressure retarded fuel injection is divided into two fuel injections: the first injection and the second injection. According to the chart, the second injection in the divided injections is performed on the retarding side compared to the case of the lump-sum injection and, therefore, is further advantageous in avoiding the abnormal combustion. This is resulted from securing the time for the vaporization and atomization of the fuel by performing the first injection in the comparatively early stage, and the contracted time length required for the vaporization and atomization of the fuel due to fuel injection amount in the second injection becoming relatively less.

Further, as indicated by the dotted line in the part (c) of FIG. 15, within the full load range, because the total fuel injection amount increases, the increased amount of fuel may be included in the intake stroke injection to be performed to improve the intake air charging efficiency.

The part (d) in FIG. 15 shows the change of the fuel pressure supplied to the direct injector 67, and in the CI mode, the fuel pressure is set constant at the minimum fuel pressure. On the other hand, in the SI mode, the fuel pressure is set to be higher than the minimum fuel pressure and is set to increase corresponding to the increase of the engine load. This is because, due to the abnormal combustion easily occurring as the engine load increases, the injection period is required to be further shortened and the injection timing is required to be further retarded.

The part (e) in FIG. 15 shows the change of the injection pulse width (opening period of the injector) corresponding to the injection period in the case of performing the lump-sum injection. In the CI mode, the pulse width widens corresponding to the increase of the fuel injection amount and, similarly in the SI mode, the pulse width widens corresponding to the increase of the fuel injection amount. However, as shown in the part (d) of FIG. 15, in the SI mode, the fuel pressure is set significantly higher in the SI mode than in the CI mode, therefore, regardless of the fuel injection amount in the SI mode being larger than that in the CI mode, the pulse width thereof is set shorter than the that in the CI mode. This shortens the unburned air-fuel mixture reactable time and is advantageous in avoiding the abnormal combustion.

Further, the part (f) in FIG. 15 shows the change of the ignition timing θ ig. In the SI mode, in addition to the fuel injection timing being retarded as the engine load increases, the ignition timing θ ig is retarded as the engine load increases as well. This is advantageous in avoiding the abnormal combustion. Further, in the CI mode, although the ignition is basically not performed, as indicated by the one-dot chain line in the chart, for example, the ignition may be performed near the exhaust top dead center so as to avoid smoldering of the ignition plug 25.

Figure 16:
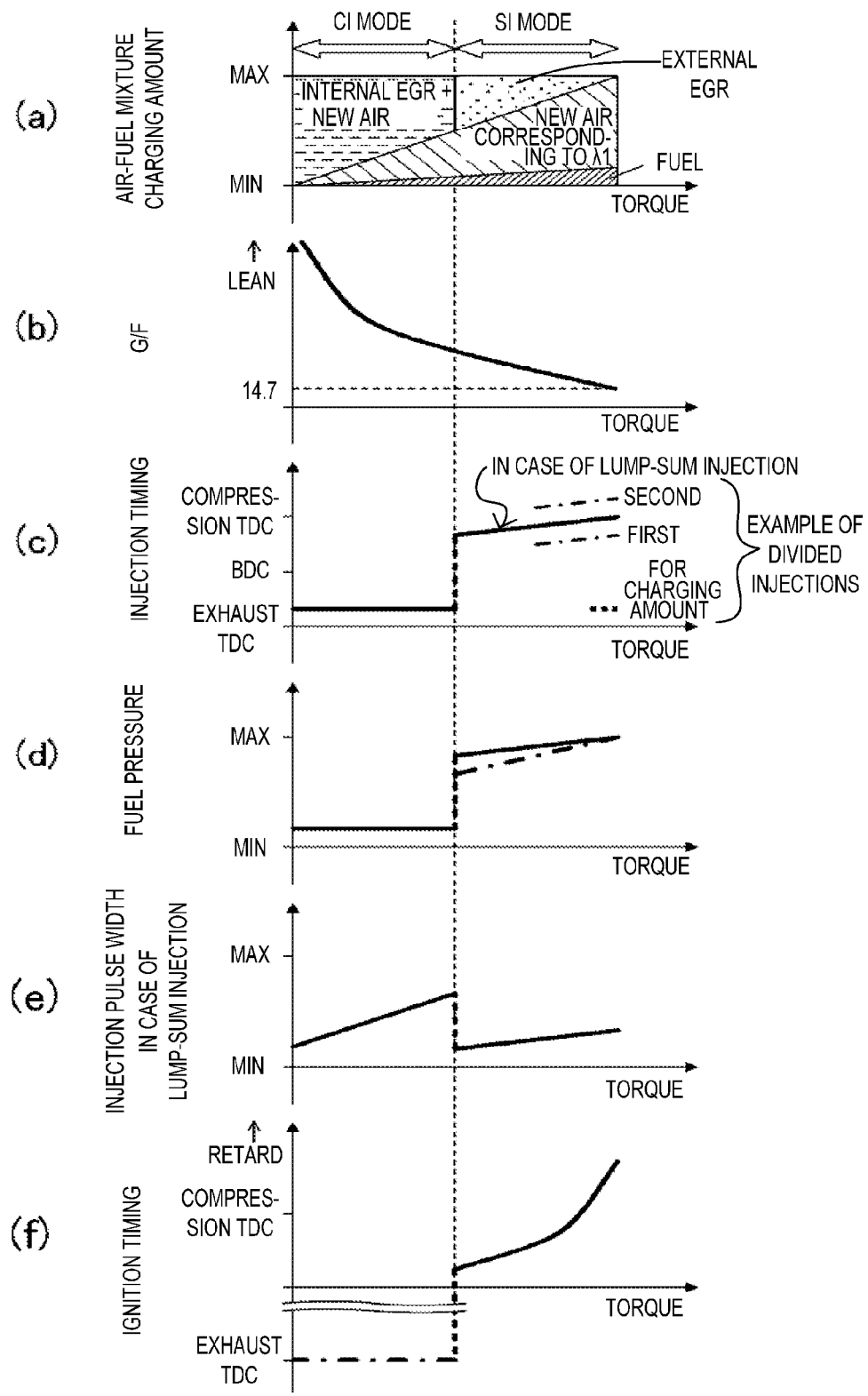
FIG. 16 is charts corresponding to FIG. 15 in a case where the control of the internal EGR amount is performed within the low engine load range, and the external EGR is utilized within the high engine load range.

FIG. 16, being different from FIG. 15, shows changes of (b) the G/F, (c) the injection timing, (d) the fuel pressure, (e) a fuel injection pulse width (i.e., injection period), and (f) the ignition timing θ ig in the case of following either one of the control examples shown in FIGS. 13 and 14. Note that, when comparing between FIGS. 15 and 16, the parts (c), (e) and (f) are the same as each other.

The state of the air-fuel mixture inside the cylinder 18 becomes the state as shown in the part (a) of FIG. 16. In the SI mode, since the external EGR gas is introduced into the cylinder 18, as shown in the part (b) of FIG. 16, the change of the G/F is continuous from the CI mode to the SI mode and gradually decreases while the engine load increases. As above, because the external EGR gas is introduced into the cylinder 18 in the SI mode, especially when the operating state of the engine 1 is within the middle engine load range, there is a possibility that the speed of the combustion subsides and the combustion period extends. Therefore, in this control example, as shown in the part (d) of FIG. 16, the fuel pressure is set to be further higher compared to the case of the part (d) in FIG. 15 (see the one-dot chain line) so as to shorten the combustion period.

Figure 17:
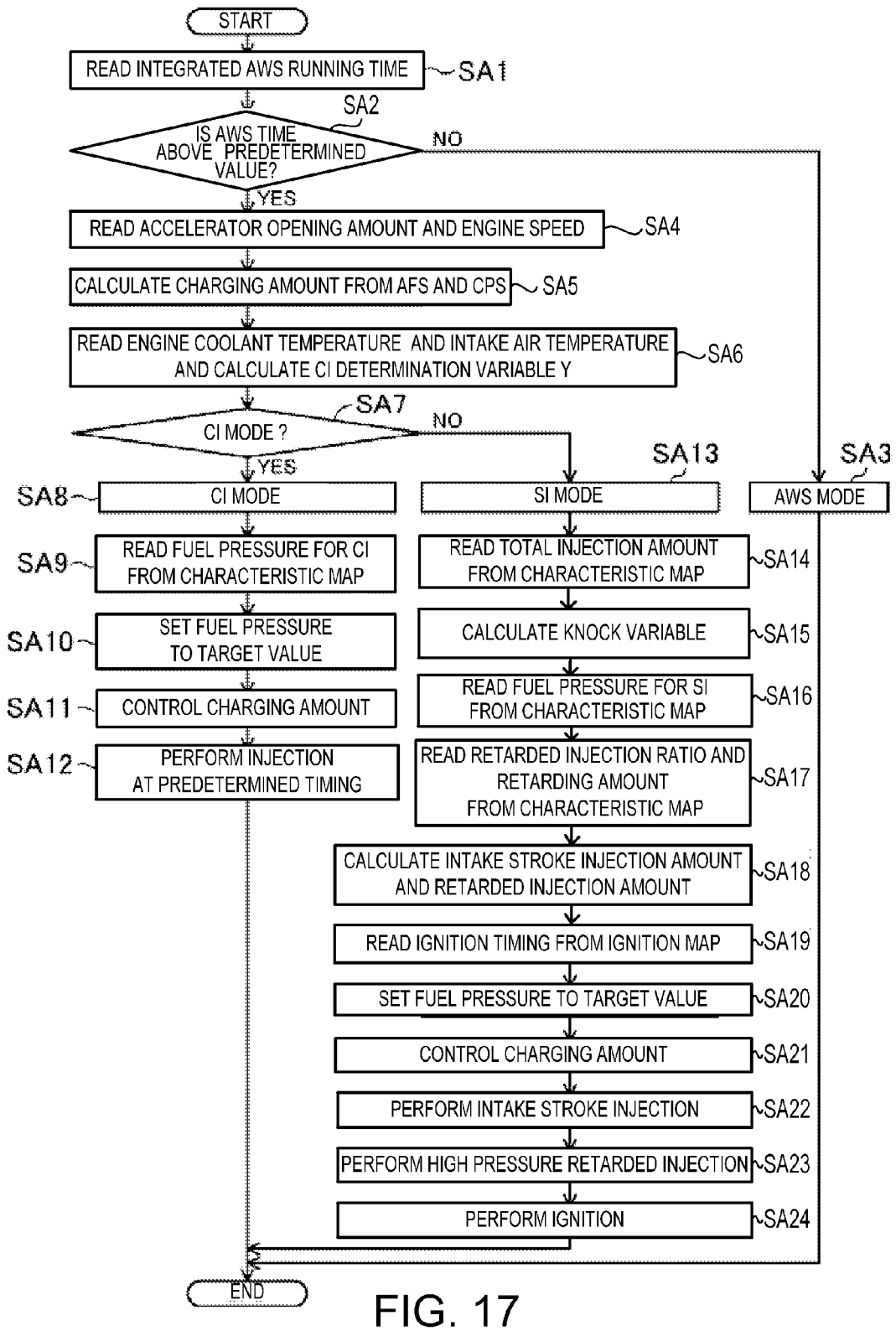
FIG. 17 is a flowchart of an engine control performed by a PCM.

Next, the control of the engine 1 is described in further detail with reference to the flowchart in FIG. 17. The flowchart shows a control flow of the engine 1 that is performed by the PCM 10. By controlling the engine 1 according to the flowchart, the state of the engine 1 according to the variation of the engine load (note that, the surrounding environment is in a steady state) becomes any one of the states shown in FIGS. 11 to 16. Note that, the flow shown in FIG. 17 does not limit the order of performing each control, and the order shown in the flow of FIG. 17 is an example. Therefore, the order of the controls may suitably be switched in the flow or a plurality of controls may be performed at the same time. Further, any of the controls may suitably be omitted from or other controls may be added in the flow shown in FIG. 17.

First, at Step SA1, an integrated AWS running time is read and, at the following Step SA2, the read AWS running time is determined whether it is above a predetermined value or not. AWS (Accelerated Warm-up System) is a system for speeding up the activation of the catalysts 41 and 42 by increasing the temperature of the exhaust gas when starting the engine 1, and thereby, promoting the purification of the exhaust gas. The AWS runs for a predetermined time length after the engine 1 is started. Therefore, if the result of the determination at Step SA2 is NO (i.e., the AWS running time is below the predetermined value), the control flow proceeds to Step SA3, and the engine is in an AWS mode. In the AWS mode, basically, the SI combustion where the intake air amount is increased and the ignition timing θ ig of the ignition plug 25 is significantly retarded is performed.

On the other hand, if the result of the determination at Step SA2 is YES (i.e., the AWS running time is above the predetermined value), the control flow proceeds to Step SA4. That is, the AWS is stopped and the engine 1 shifts to a normal operation mode.

At Step SA4, the PCM 10 first reads the accelerator opening and the engine speed and, at Step SA5, the PCM 10 calculates the charging amount of the air-fuel mixture based on an intake air flow rate detected by the air flow sensor (AFS) SW1 and the cylinder internal pressure detected by the cylinder internal sensor (CPS) SW6. At Step SA6, the PCM 10 further reads the engine coolant temperature and the temperature of the intake air to be introduced into the cylinder 18. Thereby, a CI determination variable Y is calculated based on the accelerator opening, the engine speed, the charging amount of the air-fuel mixture, the engine coolant temperature and the intake air temperature.

The CI determination variable Y is calculated from, for example, the equation below, based on each of a function I of the accelerator opening (accelerator opening), a function J of the engine speed (1/engine speed), a function K of the charging amount of the air-fuel mixture (charging amount), a function L of the engine coolant temperature (engine coolant temperature), and a function M of the intake air temperature (intake air temperature).

CI determination variable $Y = I$(accelerator opening)+$J$(1/engine speed)+$K$(charging amount)+$L$(engine coolant temperature)+$M$(intake air temperature)

This CI determination variable Y is an index of whether the air-fuel mixture can be compression-ignited near the compression top dead center. In other words, the CI determination variable Y determines whether the engine 1 should be operated in the CI mode or SI mode. For example, as shown in FIG. 18A, if the CI determination variable Y is below a first threshold, there is a high possibility of a misfire to occur when the engine is to operate in the CI mode, therefore, a determination can be performed to change to the SI mode and, on the other hand, if the CI determination variable Y is above a second threshold, there is a high possibility for a pre-ignition to occur at when the engine is to operate in the CI mode, therefore, the determination can be performed to change to the SI mode. Further, if the CI determination variable Y is above the first threshold and below the second threshold, the air-fuel mixture is compression-ignited at an appropriate timing near the compression top dead center, therefore, a determination can be performed to change to the CI mode.

Back to the control flow in FIG. 17, at Step SA7, a determination of whether to change to the CI mode is performed based on the CI determination variable Y calculated at Step SA6, and if the result of the determination is YES, the control flow proceeds to Step SA8, and the operation mode of the engine 1 is set to be in the CI mode. On the other hand, if the result of the determination is NO, the control flow proceeds to Step SA13, and the operation mode of the engine 1 is set to be in the SI mode.

In the CI mode, at Step SA9, the fuel pressure (target pressure) for the CI mode is read from a characteristic map that is set in advance and stored in the PCM 10. The characteristic map is set, as an example thereof is shown in FIG. 18B, as a primary function of the engine speed and is set so that the target pressure of the fuel increases as the engine speed increases. The maximum value of the fuel pressure for the CI mode is a predetermined value (FP1).

At the following Step SA10, the high pressure fuel supply system 62 is controlled so that the fuel pressure becomes the target pressure and, at Step SA11, a charging amount control of the air-fuel mixture is performed. The charging amount control includes, as described with reference to FIGS. 11 to 14, at least the control of opening the exhaust valve twice by controlling the VVL 71, and thereby, introduces the internal EGR gas into the cylinder 18. Thereby, at Step SA12, a set predetermined amount of fuel is additionally directly injected into the cylinder 18 through the direct injector 67 at the predetermined timing during the intake stroke or the compression stroke.

As opposed to the CI mode above, in the SI mode, at Step SA14, first a total injection amount (meaning a total amount of the fuel that is injected in one cycle of the engine) is read from a characteristic map that is set in advance and stored in the PCM 10. The characteristic map of the total injection amount is set, and an example thereof is shown in FIG. 18C, as a function of the accelerator opening and is set so that the total injection amount becomes larger as the accelerator opening becomes larger.

At the following Step SA15, a knock variable X is calculated based on the engine speed, the intake air pressure, the intake air temperature, and the total injection amount. The knock variable X is calculated from, for example, the equation below, based on each of a function A of the engine speed (1/engine speed), a function B of the intake air pressure (intake air pressure), a function C of the intake air temperature (intake air temperature), and a function D of the total injection amount (total injection amount).

knock variable $X = A$(1/engine speed)+$B$(intake air pressure)+$C$(intake air temperature)+$D$(total injection amount)

Each of the engine speed, the intake air pressure, the intake air temperature, and the total injection amount is a parameter relating to the generation of knocking and pre-ignition, and the knock variable X is an index of ease of generation of the abnormal combustion. That is, the abnormal combustion becomes easier to occur as the knock variable X becomes larger and, on the other hand, the abnormal combustion becomes harder to occur as the knock variable X becomes smaller. For example, the knock variable X for being directly related to an inverse number of the rotation speed of the engine 1 becomes smaller as the engine speed increases. Further, the knock variable X becomes larger as the total injection amount becomes larger, in other words, as the engine load increases.

At Step SA16, the fuel pressure (target pressure) for the SI mode is read from a characteristic map that is set in advance and stored in the PCM 10. This characteristic map is set, and an example thereof is shown in FIG. 18D, differing from the fuel pressure for the CI combustion (FIG. 18B), as a primary function of a function G for the knock variable and the engine speed (the knock variable and the engine speed). For example, the target pressure is set higher as the knock variable X becomes higher, which is advantageous in avoiding the abnormal combustion as described above. Note that, the minimum value of the fuel pressure for the SI mode (FP2) is set to a pressure higher than the maximum value FP1 of the fuel pressure for the CI combustion. Thereby, the fuel pressure for the SI mode is higher than the fuel pressure for the CI mode at all times.

At Step SA17, a retarded injection ratio R and a retarded injection retarding amount T are set based on characteristic maps illustratively shown in FIGS. 18E and 18F, respectively. The retarded injection ratio R is a variable for setting, within the total injection amount, the ratio of the fuel injection amount to be injected within the retard period and the intake stroke injection. The retarded injection ratio R is set larger as the knock variable X becomes larger. Here, as described below, the fuel injection amount by the high pressure retarded injection is calculated from "the total injection amount×the retarded injection ratio" and the fuel injection amount by the intake stroke injection is calculated from "the total injection amount×(1−retarded injection ratio)." Thereby, as the knock variable X becomes larger, the intake stroke injection amount is reduced while the fuel injection amount by the high pressure retarded injection is increased. Further, the retarded injection ratio is a variable within a range of above zero to one. When the retarded injection ratio is one, the entire total injection amount is injected by the high pressure retarded injection and the intake stroke injection is not performed. Here, as shown in FIG. 18E, if the knock variable X is above the predetermined value, because the retarded injection ratio R becomes one, the intake stroke injection amount becomes zero and the intake stroke injection is not performed.

Further, within the middle engine speed range of the engine 1, the retarded injection ratio becomes smaller than one because the knock variable X becomes smaller as the engine speed increases. As a result, as described above, the intake stroke injection is performed within the middle engine speed range of the engine 1 (see the part (d) in FIG. 10).

As shown in FIG. 18F, the retarded injection retarding amount T is set larger as the knock variable X becomes larger.

In other words, the injection timing of the high pressure retarded injection is set toward the retarding side as the knock variable X becomes larger. As described above, the total injection amount (engine load) and the knock variable X are proportional to each other, therefore, the injection timing of the high pressure retarded injection is set to be on the retarding side as the engine load increases. Following the retarded fuel injection timing, the ignition timing θ ig is also set to be on the retarding side as the engine load increases. The settings are advantageous in avoiding the abnormal combustion.

At Step SA18, the fuel injection amount is calculated from the following equations, based on the read retarded injection ratio.

intake stroke injection amount=total injection amount×(1−retarded injection ratio $R$)

high pressure retarded injection amount=total injection amount×retarded injection ratio $R$ At Step SA19, the ignition timing θ ig is read from an ignition map as illustratively shown in FIG. 18G that is set in advance and stored in the PCM 10. This ignition map is a map for setting an ignition timing θ ig (IG) based on the engine speed and the acceleration opening. The ignition timing θ ig is set to be on the retarding side as the engine speed decreases and the accelerator opening increases, in other words, toward upper leftward in the map, and the ignition timing θ ig is set to be on the advancing side as the engine speed increases and the accelerator opening decreases, in other words, toward lower rightward in the map (IG1<IG2<IG3). Note that, here, the ignition timing is set later than the fuel injection timing described above.

Thereby, the target fuel pressure, the fuel injection amount and timing of the high pressure retarded injection, the fuel injection amount and timing for the intake stroke injection when performing the intake stroke injection, and the ignition timing θ ig are set. At the following Step SA20, first the high pressure fuel supply system 62 is controlled so that the fuel pressure reaches the target pressure, and at the next Step SA21, the charging amount of the air-fuel mixture is controlled. The charging amount control is, as shown in FIGS. 11 to 14, in the SI mode where the engine is operated at the air-fuel ratio λ=1, performed to satisfy the air-fuel ratio λ=1 according to the set total injection amount, and in the charging amount control, the control of throttling the intake air to be introduced into the cylinder 18 and/or the control of introducing the external EGR gas into the cylinder 18 is/are performed.

At Step SA22, the intake stroke injection by the set fuel injection amount is performed at the set injection timing. Here, as described above, the fuel is injected into the intake port 16 by the port injector 68. Note that, in the case where the fuel injection amount of the intake stroke injection is set to be zero, Step SA22 is substantially omitted.

At Step SA23, the high pressure retarded injection by the set fuel injection amount is performed at the set injection timing. Therefore, the injection timing is within the retard period from the late stage of the compression stroke to the early stage of the expansion stroke, and the fuel is directly injected into the cylinder 18 by the direct injector 67. Note that, the high pressure retarded injection may be, as described as above, the divided injections including the two fuel injections of the first and second injections that are performed within the retard period, for example according to the fuel injection amount. Thereby, at Step SA24, the ignition by the ignition plug 25 is performed at the set ignition timing θ ig.

Note that, in the above configuration, when the operating state of the engine 1 is within the low engine load range of the low engine speed range, the combustion mode is in the CI mode where the compression-ignition combustion is performed; however, alternatively, even when the operating state of the engine 1 is within the low engine load range of the load engine speed range, the engine 1 may be in an operation mode where a combustion is performed by spark igniting stratified lean air-fuel mixture.

Further, in the above configuration, as it is clear from, for example, FIG. 11, the switch between the CI and SI modes is synchronized with performing and stopping the control of opening the exhaust valve 22 twice. In other words, when the operating state of the engine 1 is within either one of the low and middle engine load range of the low engine speed range and the combustion ignition combustion is performed, the internal EGR gas is certainly introduced into the cylinder 18. Whereas, when the operating state of the engine 1 is within the middle engine load range of the low engine speed range, the CI mode may be performed while control of opening the exhaust valve 22 twice is stopped and the internal EGR is stopped. That is, when the operating range of the engine 1 is within the middle engine load range of the low engine speed range, the compression-ignition combustion may be performed without introducing the internal EGR gas into the cylinder 18. In other words, in view of avoiding the temperature inside the cylinder 18 from increasing excessively and securing the required amount of new air, in the CI mode where the compression-ignition combustion is performed, the internal EGR is stopped at a predetermined engine load (middle engine load) in the above configuration, meanwhile, the range where the compression-ignition combustion is performed may be enlarged to the high engine load side.

Further, the port injector 68 and the low pressure fuel supply system 66 may be omitted and the intake stroke injection may be performed by the direct injector 67.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE NUMERALS

1 Engine (Engine Body)
10 PCM (Controller)
12 Cylinder Head
14 Piston
141 Cavity
18 Cylinder
19 Combustion Chamber
21 Intake Valve
22 Exhaust Valve
25 Ignition Plug
50 EGR Passage
62 High Pressure Fuel Supply System (Fuel Pressure Variable Mechanism)
67 Direct Injector (Fuel Injection Valve)

The invention claimed is:

1. A control device of a spark-ignition gasoline engine, comprising:
    an engine body having a cylinder of which a geometric compression ratio is set to 14:1 or above, and for being supplied with fuel containing at least gasoline;
    a fuel injection valve for injecting the fuel into the cylinder;
    an ignition plug arranged to be oriented inside the cylinder and for igniting an air-fuel mixture within the cylinder;

a fuel pressure variable mechanism for changing a pressure of the fuel that is injected by the fuel injection valve; and a controller for operating the engine body by controlling at least the fuel injection valve, the ignition plug, and the fuel pressure variable mechanism, wherein when an operating state of the engine body is within a low engine speed range, the controller controls the fuel pressure variable mechanism so that the fuel pressure is higher within a high engine load range compared to a low engine load range, the controller operates, within the high engine load range, the fuel injection valve to perform a fuel injection at least at a timing that is more retarded than an injection timing of the fuel within the low engine load range and is within a retard period from a late stage of a compression stroke to an early stage of an expansion stroke, and the controller operates, within the high engine load range, the ignition plug to ignite at a timing within the retard period and after the fuel injection.

2. The control device of claim 1, wherein when the operating state of the engine body is within the high engine load range of the low engine speed range, the controller retards the injection timing of the fuel and the timing of the ignition as an engine load increases.

3. The control device of claim 1, wherein when the operating state of the engine body is within the high engine load range of the low engine speed range, the controller operates the engine body at an air-fuel ratio of $\lambda=1$.

4. The control device of claim 1, wherein when the operating state of the engine body is within the high engine load range of the low engine speed range, the fuel pressure variable mechanism sets the fuel pressure to 40 MPa or above.

5. The control device of claim 1, wherein the fuel injection valve is formed with a plurality of nozzle holes so that atomized fuel that is injected from the nozzle holes radially spreads within the cylinder.

6. The control device of claim 5, wherein the fuel injection valve is arranged in a center portion of a ceiling part of a combustion chamber defined by the cylinder, a piston inserted in the cylinder, and a cylinder head, wherein the piston is formed with a cavity on a top face thereof, and wherein the atomized fuel injected during the retard period is accommodated within the cavity.

7. The control device of claim 1, further comprising an EGR passage for circulating a part of burned gas on an exhaust side of the engine body back to an intake side thereof, wherein when the operating state of the engine body is within the high engine load range of the low engine speed range from which at least a full engine load is excluded, the controller performs exhaust gas re-circulation via the EGR passage.

8. The control device of claim 1, wherein when the operating state of the engine body is within the high engine load range of the low engine speed range, the controller operates the fuel injection valve to perform a plurality of fuel injections during the retard period.

9. The control device of claim 8, wherein the controller operates the fuel injection valve to perform, during the retard period, two fuel injections including a first injection and a following second injection, in which a fuel injection amount in the second injection is larger than a fuel injection amount in the first injection.

10. The control device of claim 1, wherein when the operating state of the engine body is within the low engine load range of the low engine speed range, the controller operates the fuel injection valve to form a stratified lean air-fuel mixture within the cylinder by injecting the fuel during the compression stroke, and operates the ignition plug to ignite the stratified lean air-fuel mixture at a predetermined timing.

11. The control device of claim 1, wherein when the operating state of the engine body is within the low engine load range of the low engine speed range, the controller operates the fuel injection valve to inject the fuel at a timing advanced than the fuel injection timing within the retard period, and compression-ignites the air-fuel mixture within the cylinder by allowing a part of burned gas of the engine body to exist within the cylinder.

12. The control device of claim 11, wherein when the operating state of the engine body is within the low engine load range of the low engine speed range, the controller controls at least either one of an intake valve and an exhaust valve attached to the engine body to substantially leave the part of the burned gas within the cylinder.

13. A method of controlling a spark-ignition engine including an engine body having at least one cylinder of which a geometric compression ratio is set to 14:1 or above and for being supplied with fuel containing at least gasoline, a fuel injection valve for injecting the fuel into the cylinder, an ignition plug arranged to be oriented inside the cylinder and for igniting an air-fuel mixture within the cylinder, a fuel pressure variable mechanism for changing a pressure of the fuel that is injected by the fuel injection valve; the method comprising the steps of:

controlling the fuel pressure variable mechanism so that the fuel pressure is higher within a high engine load range compared to a low engine load range, when an operating state of the engine body is within a low engine speed range;

operating the fuel injection valve within the high engine load range to perform a fuel injection at least at a timing that is more retarded than an injection timing of the fuel within the low engine load range and is within a retard period from a late stage of a compression stroke to an early stage of an expansion stroke; and operating the ignition plug within the high engine load range to ignite at a timing within the retard period and after the fuel injection.

* * * * *